US012652571B2

(12) United States Patent
Kanamarlapudi et al.

(10) Patent No.: US 12,652,571 B2
(45) Date of Patent: Jun. 9, 2026

(54) UPLINK PDU SETS AND REFLECTIVE QoS IN RADIO ACCESS NETWORKS

(71) Applicant: QUALCOMM Incorporated, San Diego, CA (US)

(72) Inventors: Sitaramanjaneyulu Kanamarlapudi, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/164,551

(22) Filed: Feb. 3, 2023

(65) Prior Publication Data

US 2024/0267778 A1 Aug. 8, 2024

(51) Int. Cl.
*H04W 28/02* (2009.01)
*H04W 76/20* (2018.01)

(52) U.S. Cl.
CPC ............... *H04W 28/0268* (2013.01); *H04W 28/0273* (2013.01); *H04W 76/20* (2018.02)

(58) Field of Classification Search
None
See application file for complete search history.

(56) References Cited

U.S. PATENT DOCUMENTS

| | | | | |
|---|---|---|---|---|
| 2020/0008118 A1* | 1/2020 | Han | | H04W 68/005 |
| 2021/0400521 A1* | 12/2021 | Fiorani | | H04W 28/10 |
| 2022/0014963 A1* | 1/2022 | Yeh | | G06N 3/045 |
| 2023/0189055 A1* | 6/2023 | Tooher | | H04W 28/0268 |
| | | | | 370/328 |

FOREIGN PATENT DOCUMENTS

| | | |
|---|---|---|
| EP | 3579506 B1 | 9/2021 |
| WO | 2021236744 A1 | 11/2021 |

OTHER PUBLICATIONS

International Search Report and Written Opinion—PCT/US2023/084117—ISA/EPO—Mar. 15, 2024.
Vice Chairman (Nokia): "Report on LTE/NR17 Legacy, XR, MUSIM, WUS, QoE and NW Energy", 3GPP TSG-RAN WG2 Meeting #119 electronic, R2-2208702, Online, Aug. 2022 , vol. RAN WG2, No. electronic, Sep. 3, 2022, 83 Pages, XP052262004, p. 58-p. 65.

* cited by examiner

*Primary Examiner* — Eunsook Choi
(74) *Attorney, Agent, or Firm* — Procopio, Cory, Hargreaves & Savitch LLP

(57) ABSTRACT

Apparatuses and methods for configuring uplink PDU sets and reflective QoS in radio access networks are described. An apparatus is configured to receive, from a network node, a mapping configuration indicating configured mappings between a QoS flow and an UL radio bearer associated with transmission of a PDU set(s), and to switch the QoS flow to map to another UL radio bearer based on a presence of a condition associated with the transmission of a PDU set of the PDU set(s). Another apparatus is configured to receive, from a UE, indications of UE capability associated with mapping a QoS flow with UL radio bearers for transmission of a PDU set(s), and to configure the UE, based on the indication of the UE capability, with a mapping configuration that indicates a configured mapping between the QoS flow and an UL radio bearer associated with transmission of the PDU set(s).

30 Claims, 12 Drawing Sheets

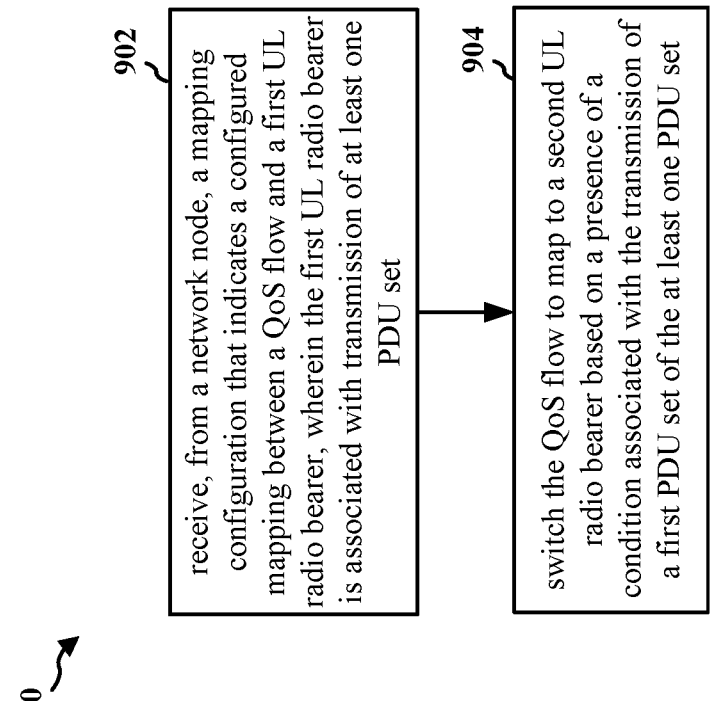

900

902 receive, from a network node, a mapping configuration that indicates a configured mapping between a QoS flow and a first UL radio bearer, wherein the first UL radio bearer is associated with transmission of at least one PDU set

904 switch the QoS flow to map to a second UL radio bearer based on a presence of a condition associated with the transmission of a first PDU set of the at least one PDU set

FIG. 9

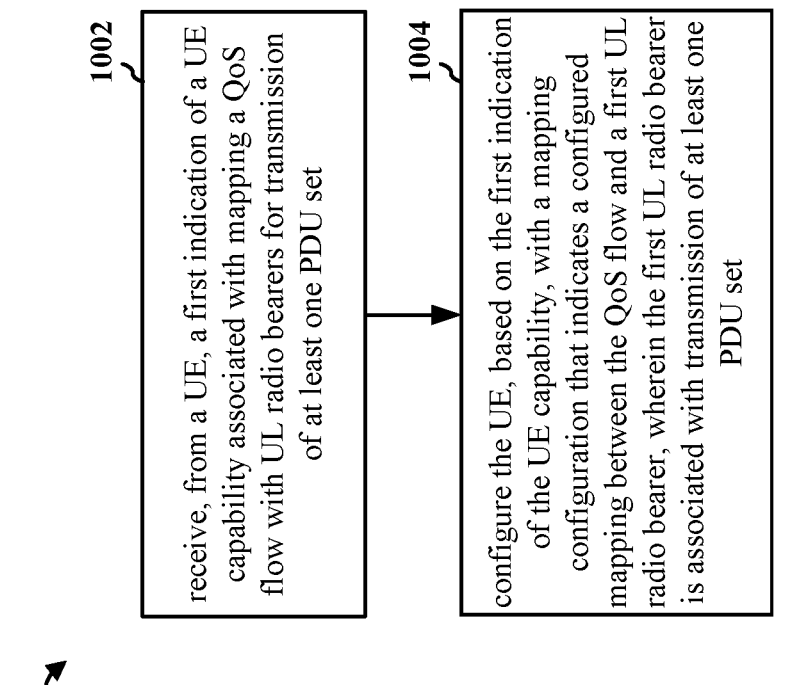

1000

1002 receive, from a UE, a first indication of a UE capability associated with mapping a QoS flow with UL radio bearers for transmission of at least one PDU set

1004 configure the UE, based on the first indication of the UE capability, with a mapping configuration that indicates a configured mapping between the QoS flow and a first UL radio bearer, wherein the first UL radio bearer is associated with transmission of at least one PDU set

FIG. 10

UPLINK PDU SETS AND REFLECTIVE QoS IN RADIO ACCESS NETWORKS

TECHNICAL FIELD

The present disclosure relates generally to communication systems, and more particularly, to wireless communications and quality of service (QoS) flows.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to receive, from a network node, a mapping configuration that indicates a configured mapping between a quality of service (QoS) flow and a first uplink (UL) radio bearer, where the first UL radio bearer is associated with transmission of at least one packet data unit (PDU) set. The apparatus is configured to switch the QoS flow to map to a second UL radio bearer based on a presence of a condition associated with the transmission of a first PDU set of the at least one PDU set.

In the aspect, the method includes receiving, from a network node, a mapping configuration that indicates a configured mapping between a QoS flow and a first UL radio bearer, where the first UL radio bearer is associated with transmission of at least one PDU set. The method also includes switching the QoS flow to map to a second UL radio bearer based on a presence of a condition associated with the transmission of a first PDU set of the at least one PDU set.

In another aspect of the disclosure, a method, a computer-readable medium, and an apparatus are provided. The apparatus is configured to receive, from a user equipment (UE), a first indication of a UE capability associated with mapping a QoS flow with UL radio bearers for transmission of at least one PDU set. The apparatus is configured to configuring the UE, based on the first indication of the UE capability, with a mapping configuration that indicates a configured mapping between the QoS flow and a first UL radio bearer, where the first UL radio bearer is associated with transmission of the at least one PDU set.

In the aspect, the method includes receiving, from a UE, a first indication of a UE capability associated with mapping a QoS flow with UL radio bearers for transmission of at least one PDU set. The method also includes configuring the UE, based on the first indication of the UE capability, with a mapping configuration that indicates a configured mapping between the QoS flow and a first UL radio bearer, where the first UL radio bearer is associated with transmission of the at least one PDU set.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a flowchart of a method of wireless communication, in accordance with various aspects of the present disclosure.

FIG. 10 is a flowchart of a method of wireless communication, in accordance with various aspects of the present disclosure.

DETAILED DESCRIPTION

Figure 1:
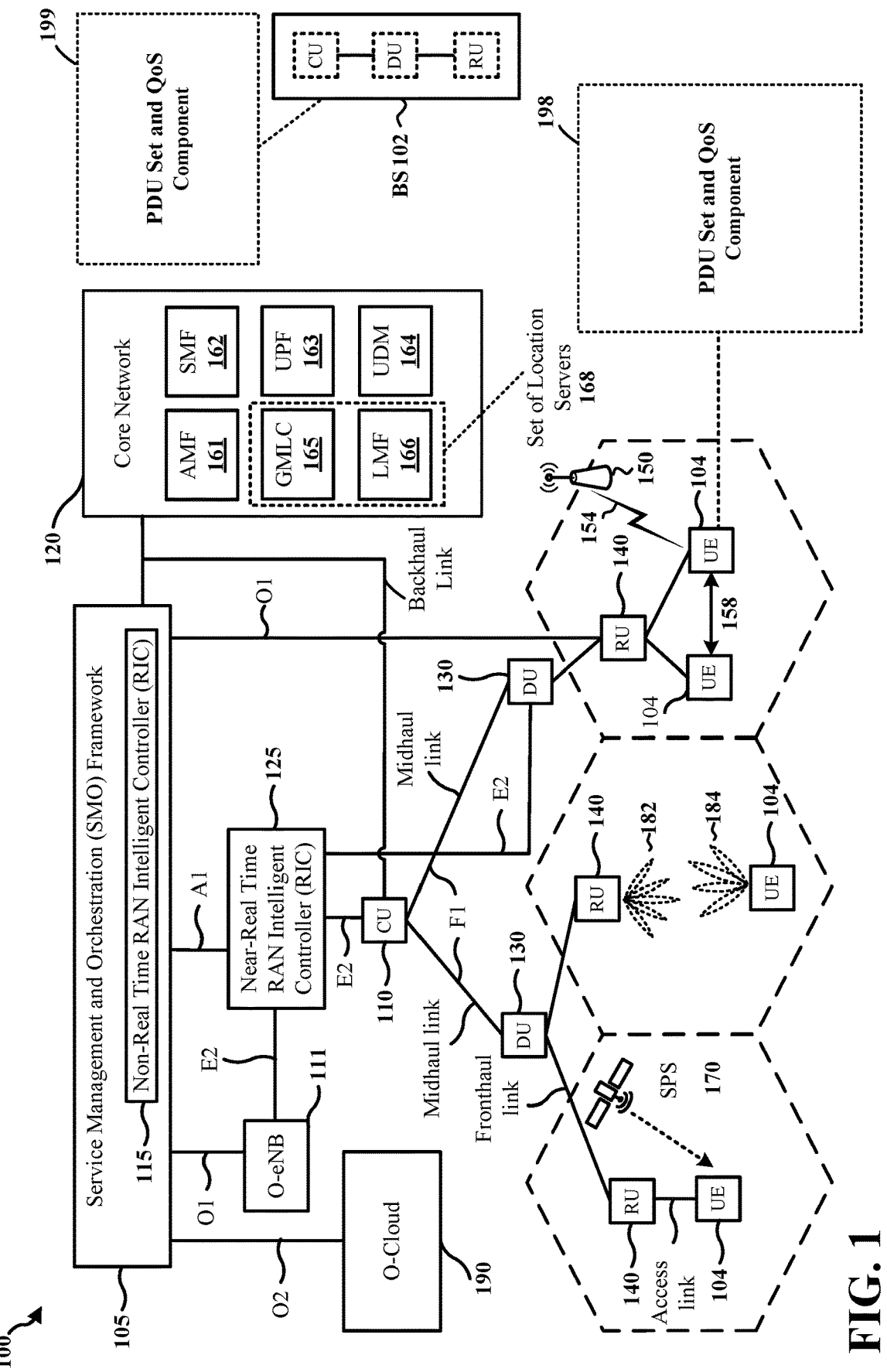
FIG. 1 is a diagram illustrating an example of a wireless communications system and an access network.

Wireless communication networks, such as a 5G NR network, may enable traffic flows with specific characteristics. Traffic flows may have various characteristics in wireless communication networks, e.g., including layer attributes, timeframes for latency, etc. As an example, extended reality (XR) traffic for UL and DL may have characteristics such as application layer attributes, short timeframes for exchange where longer latency for traffic flows may reduce a user experience with an XR application or device, etc. XR traffic bursts may be periodic but may include some time jitter in their arrival, and the XR packet sizes, and the number of packets, for certain bursts may be variable. That is, XR service characteristics such as periodicity, multiple flows, jitter, latency, reliability, etc., may affect signaling throughput, latency, and other operations at base stations and other devices such as UEs on a wireless communication network. Additionally, XR traffic bursts may be associated at a UE with a QoS flow that is mapped to a given radio bearer.

A PDU set may be delivered as an integrated unit to an application by a RAN. For example, a PDU set may be associated with a video frame or a slice within a video frame or the like. PDUs in the same PDU set may share common QoS attributes, and PDU sets may have different decoding criteria, which may depend on implementations for individual applications. Additionally, PDUs may be discarded by a UE and/or a RAN due to various conditions. For example, when a PDU does not have delay budget left, or one or more of its associated Layer-2 timers have expired, the PDU may be discarded. A PDU may also be discarded when the content criteria of its associated PDU set may no longer be met or already have been met.

Various aspects presented herein relate generally to wireless communications systems and user equipment utilization of UL transmissions. Some aspects more specifically relate to configuring uplink PDU sets and reflective QoS in radio access networks. In some examples, a UE may receive a mapping configuration that indicates a configured mapping between a QoS flow and a first UL radio bearer, where the first UL radio bearer is associated with transmission of at least one PDU set. The UE may switch the QoS flow to map to a second UL radio bearer based on a presence of a condition associated with the transmission of a first PDU set of the at least one PDU set.

Particular aspects of the subject matter described in this disclosure can be implemented to realize one or more of the following potential advantages. Some aspects herein may provide UL flexibility for radio bearer mappings in association with QoS flows that enable a UE to quickly and dynamically adapt operations for improved signaling throughput and latency reduction in wireless communication networks. While the network may provide various configurations for QoS flows to the UE, the aspects herein enable the UE to adjust its implemented configurations based on dynamic radio conditions and network traffic, which improves signaling and latency. For example, aspects herein provide for a UE to receive, from a network node (e.g., a base station or a component of a base station), a mapping configuration that indicates a configured mapping between a QoS flow and a first UL radio bearer associated with transmission of at least one PDU set. The network node may configure the UE via semi-static RRC signaling, dynamic reflective QoS (RQoS), and/or the like. The UE may thus be enabled and configured to switch the QoS flow to map to a second UL radio bearer based on a presence of a condition associated with the transmission of a first PDU set of the at least one PDU set. Likewise, the aspects herein enable a network node (e.g., a base station) to receive, from a UE, a first indication of a UE capability associated with mapping a QoS flow with UL radio bearers for transmission of at least one PDU set. The UE may thus be enabled and configured, based on the first indication of the UE capability, with a mapping configuration that indicates a configured mapping between the QoS flow and a first UL radio bearer associated with transmission of the at least one PDU set.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a sub-scriber unit, a wireless unit, a remote unit, a mobile device, a wireless device, a wireless communications device, a remote device, a mobile subscriber station, an access termi-nal, a mobile terminal, a wireless terminal, a remote termi-nal, a handset, a user agent, a mobile client, a client, or some other suitable terminology. In some scenarios, the term UE may also apply to one or more companion devices such as in a device constellation arrangement. One or more of these devices may collectively access the network and/or indi-vidually access the network.

Referring again to FIG. 1, in certain aspects, the UE 104 may have a PDU set and QoS component 198 ("component 198") that may be configured to receive, from a network node, a mapping configuration that indicates a configured mapping between a QoS flow and a first UL radio bearer, where the first UL radio bearer is associated with transmis-sion of at least one PDU set. The component 198 may be configured to switch the QoS flow to map to a second UL radio bearer based on a presence of a condition associated with the transmission of a first PDU set of the at least one PDU set. The component 198 may be configured to transmit, to the network node and prior to switching the QoS flow to map to the second UL radio bearer, one or more PDUs of the at least one PDU set via the first UL radio bearer based on an absence of the condition. The component 198 may be configured to obtain an indication for the presence of the condition associated with the transmission of the first PDU set of the at least one PDU set from at least one of the network node or an operation performed at the UE. The component 198 may be configured to receive, from the network node, an indication of criteria for the condition via at least one of RRC signaling, PDCP signaling, RLC sig-naling, or a MAC-CE. The component 198 may be config-ured to store the criteria for the condition in a memory of the UE. The component 198 may be configured to transmit, for the network node, an end marker associated with a first identifier for the first UL radio bearer via the first UL radio bearer, and to transmit, for the network node and via the second UL radio bearer, at least one of: a start marker associated with a second identifier for the second UL radio bearer, or a new data transmission. The component 198 may be configured to receive, from the network node via a DL reflective QoS process, an additional mapping configuration that indicates an additional configured mapping between the QoS flow and at least one of the first UL radio bearer or a third UL radio bearer, and to switch the QoS flow, based on the additional mapping configuration, to map the QoS flow to the at least one of the first UL radio bearer or the third UL radio bearer. In certain aspects, the base station 102 may have a PDU set and QoS component 199 ("component 199") that may be configured to receive, from a UE, a first indication of a UE capability associated with mapping a QoS flow with UL radio bearers for transmission of at least one PDU set. The component 199 may be configured to config-ure the UE, based on the first indication of the UE capability, with a mapping configuration that indicates a configured mapping between the QoS flow and a first UL radio bearer, where the first UL radio bearer is associated with transmis-sion of at least one PDU set. The component 199 may, where the mapping configuration further indicates at least one conditional mapping between the QoS flow and at least one additional UL radio bearer, where the at least one condi-tional mapping is included in a QoS IE, be configured to receive, from the UE, a second indication that the UE has switched the QoS flow to map to a second UL radio bearer based on a presence of a condition associated with the transmission of a first PDU set of the at least one PDU set, where the second UL radio bearer is one of the UL radio bearers. The component 199 may be configured to receive, from the UE and prior to receiving the second indication, one or more PDUs of the at least one PDU set via the first UL radio bearer based on an absence of the condition. The component 199 may be configured to provide, for the UE, a third indication for the presence of the condition associated with the transmission of the first PDU set of the at least one PDU set. The component 199 may be configured to provide, for the UE, a fourth indication of criteria for the condition via at least one of RRC signaling, PDCP signaling, RLC signaling, or a MAC-CE. The component 199 may be configured to receive, from the UE, an end marker associ-ated with a first identifier for the first UL radio bearer via the first UL radio bearer, and to receive, from the UE and via the second UL radio bearer, at least one of: a start marker associated with a second identifier for the second UL radio bearer, or a new data transmission. That is, aspects provide configurations for uplink PDU sets and reflective QoS in radio access networks and UL flexibility for radio bearer mappings in association with QoS flows that enable a UE to quickly and dynamically adapt operations for improved signaling throughput and latency reduction in wireless com-munication networks. While the network may provide vari-ous configurations for QoS flows to the UE, the aspects herein enable the UE to adjust its implemented configura-tions based on dynamic radio conditions and network traffic, which improves signaling and latency. Likewise, the aspects herein enable a network node (e.g., a base station) to receive, from a UE, a first indication of a UE capability associated with mapping a QoS flow with UL radio bearers for trans-mission of at least one PDU set. The UE may thus be enabled and configured, based on the first indication of the UE capability, with a mapping configuration that indicates a configured mapping between the QoS flow and a first UL radio bearer associated with transmission of the at least one PDU set.

Figures 2A, 2B, 2C, 2D:
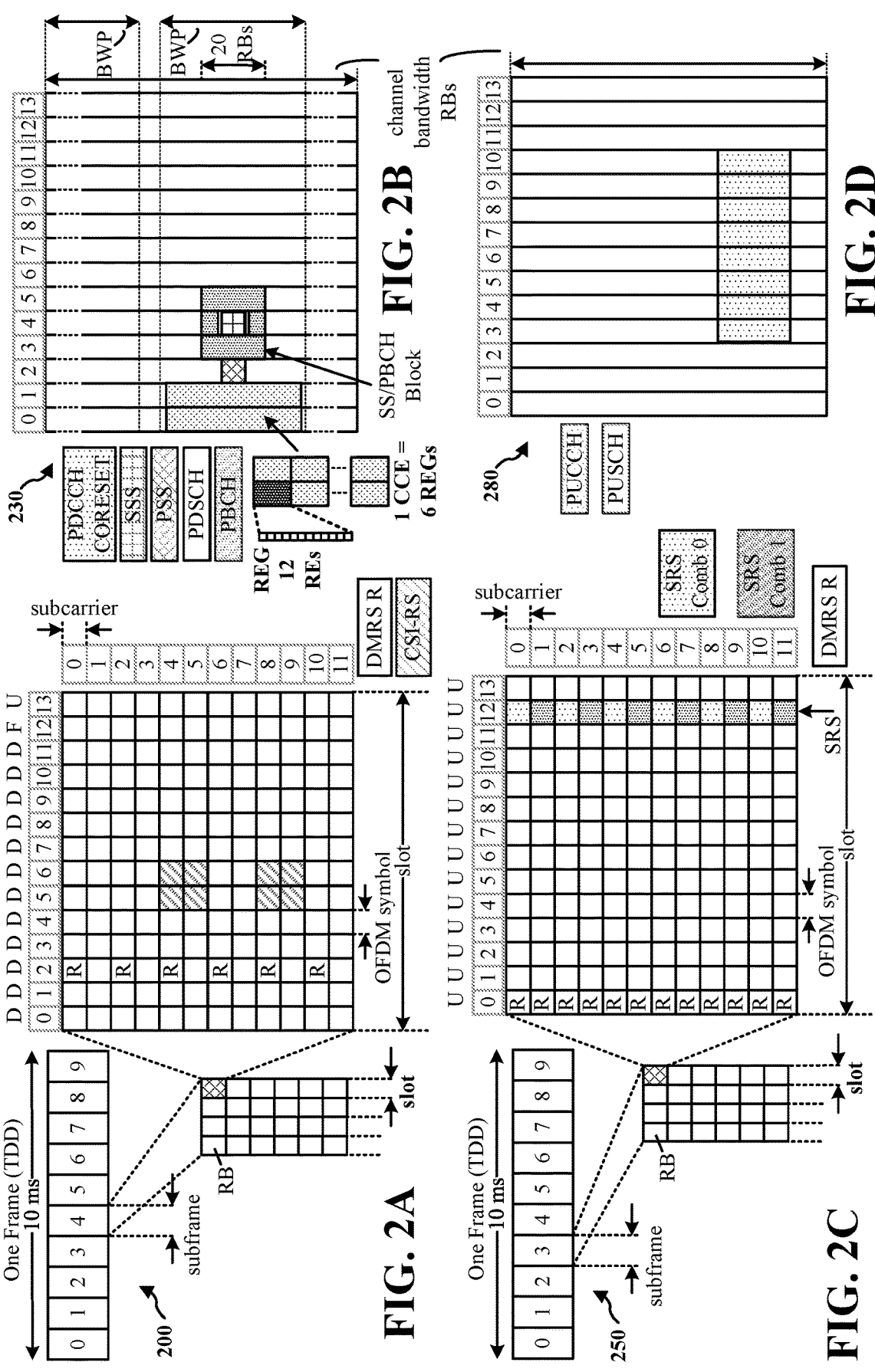
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu} * 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
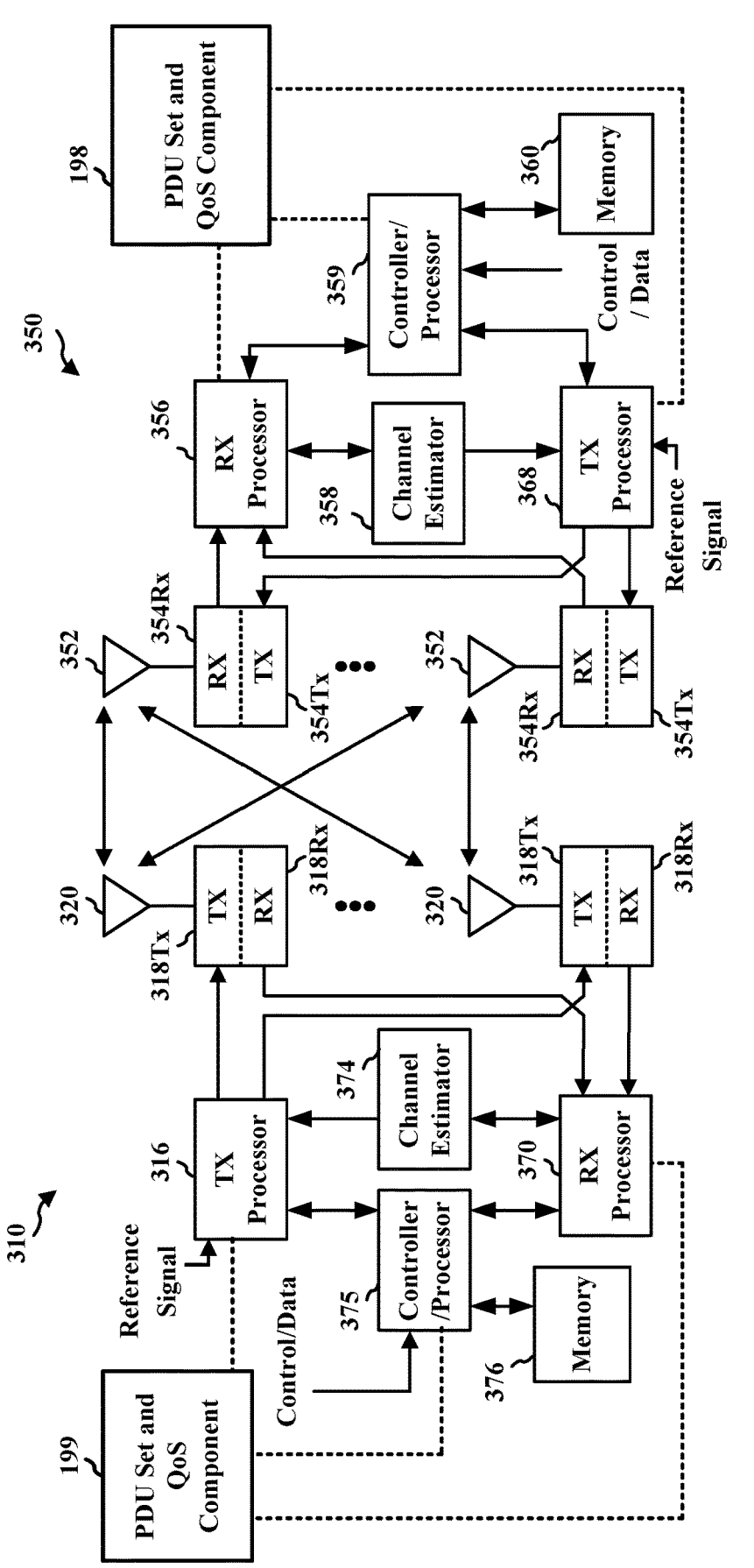
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1. At least one of the TX processor 316, the RX processor 370, and the controller/processor 375 may be configured to perform aspects in connection with the component 199 of FIG. 1.

Traffic flows may have various characteristics in wireless communication networks, e.g., including layer attributes, timeframes for latency, etc. As an example, XR traffic for UL and DL, may have characteristics such as application layer attributes, short timeframes for exchange where longer latency for traffic flows may reduce a user experience with an application or device, etc. Additionally, such traffic bursts may be periodic but may include some time jitter in their arrival, and the packet sizes, and the number of packets, for certain bursts may be variable. That is, service characteristics such as periodicity, multiple flows, jitter, latency, reliability, etc., may affect power usage and operations at base stations and other devices on a wireless communication network.

A PDU set may be a set of one or more PDUs to be delivered as an integrated unit to an application by a RAN. For example, a PDU Set may be associated with a video frame or a slice within a video frame or the like. PDUs in the same PDU set may share common QoS attributes, e.g., a PDU set delay budget (PSDB), a PDU set error rate (PSER), etc., and PDU sets may have different decoding criteria (e.g., PDU set content criteria (PSCC)), which may depend on implementations for individual applications. Example PSCC may include, without limitation, "all or nothing" (e.g., if any PDU in the PDU set is lost, the whole PDU set may become obsolete), "good until first loss" (e.g., all PDUs received are good until the first loss happens), application-layer (AL) FEC (AL-FEC) (e.g., PDUs in a PDU set may be encoded using AL-FEC, etc., and based on the redundancy ratio of the FEC, a subset of PDUs in the PDU set may be utilized by an application(s) to decode the PDU set). Additionally, PDUs may be discarded by a UE and/or a RAN due to various conditions. For example, when a PDU does not have delay budget left, or one or more of its associated Layer-2 timers have expired (e.g., a PDCP discard timer, a RLC reassembly timer, a RLC discard timer, a PDCP reordering timer, etc.), the PDU may be discarded. As another example, a PDU may be discarded when the content criteria of its associated PDU set may no longer be met or already have been met, e.g., a loss has occurred if the content criteria is "all or nothing" or "good until the first loss," a threshold number of PDUs in the PDU set have already been successfully received/sent so subsequent PDUs are superfluous, etc.

UL PDU sets may share aspects with DL PDU sets. One example may be UL PDU set marking where a same kind of packet filter is used by UPF for DL PDU set marking (e.g., by matching a real-time transport protocol (RTP) or secure RTP (SRTP) header and payload; or based on UE implementation it may be a same implementation by UPF in marking DL PDU sets). Another example may be UL PDU set QoS attributes. For instance, PSDB may be defined as an upper bound for the delay between the time when the last PDU in a UL PDU set is received at a UE's SDAP service access point and the time when it is successfully received at a receiver; and PSER may be defined as an upper bound for the ratio between the number of UL PDU sets not successfully received and the total number of UL PDU sets sent within a configured measurement window. UL PDU set information for RAN may also include shared aspects. For instance, common RAN information may include a PDU set identifier (e.g. sequence number) (U-plane), a boundary indication of an UL PDU set (e.g. start and end of a PDU set) (U-plane), a PDU set size in bytes or number of PDUs in PDU Set (U-plane), an importance of a PDU set (U-plane), traffic parameters such as periodicity (C-plane), whether in-order delivery is utilized r not (C-plane), etc.

PDU set importance may be associated with each PDU set instead of a QoS flow. In other words, each PDU set may be assigned its own importance level. However, regardless of respective importance levels, PDU sets with a same QoS flow identifier (QFI) may still belong to the same QoS flow. PSDB and PSER may be configured for a QoS flow, however, they may differ in how they are used. For instance, PSDB may be common to the PDU sets in a QoS flow, and PSER may be measured based on a set of PDU sets sent in a configured time window (e.g., if a UE discards one or more PDU sets selectively, then it is possible that PDU sets with high importance may have a lower PSER than other PDU sets, while the overall error rate may still meet the configured PSER. Accordingly, importance may be orthogonal to PSDB, importance may be more related to differentiated reliability (e.g., error/loss rate), which may thus result in more protection for PDU Sets with high importance (e.g. selective duplication), and may result in prioritized scheduling in case of UL congestion, e.g., to reduce the likelihood of PDUs being discarded due to delay longer than the PSDB.

As described herein, a sub-QoS flow may include one or more PDUs with the same importance level (or PDU set type) within a QoS flow, and a QoS flow may include multiple sub-QoS flows. Additionally, a radio bearer (xRB), generally, may refer to various types of radio bearers, where "x" is utilized to denote the generic connotation. For instance, a xRB may be a data radio bearer (DRB), a signaling radio bearer (SRB), a multicast radio bearer (MRB), and/or the like.

When a data packet arrives at SDAP service access point (SAP), two operations may take place. In one operation, a UE may identify which sub-QoS flow and/or QoS flow with which the data packet is associated. Based on, for example, the QoS Flow to xRB mapping present with SDAP (which may be based on either semi-static RRC configuration or based on dynamic information derived from reflective QoS (RQoS) mechanisms), traffic may be steered towards a specific radio bearer (e.g., a DRB). In another operation, based on QoS flow characteristics, scheduling delays/BLER, and other characteristics, a RAN may have a choice to switch a QoS flow(s) to different xRBs, e.g., through either a non-access stratum (NAS) or an access stratum (AS) level of mapping update information through a RQoS mechanism. The above two operations may be conceptualized as an outer loop of control, and may consume time to change the mappings. For example, the characterization for the traffic characteristics may consume more time than desired or than available at the RAN level, and switching from one xRB to another xRB may not have any timing constraints due to, e.g., underlying delays in scheduling DL packet as well as HARQ/RLC ARQ mechanisms to deliver the packet and in-seq delivery from PDCP to SDAP. Further, switching from the old xRB to a new xRB may depend on how much data is already built in as part of the old PDCP serial number (SN). That is, it may take any time between truly switching to a new xRB and an "END" marker on an old xRB and a "START" marker on a new xRB. For DL RQoS, switching from one xRB to another xRB also may not have any timing constraints due to, e.g., underlying delays in scheduling DL packet as well as HARQ/RLC ARQ mechanisms to deliver the packet and in-seq delivery from PDCP to SDAP. Even with a received DL RQoS command, from the UL perspective, switching from the old xRB to the new xRB may depend on how much data is already built in as part of old xRB PDCP SN space from the UL perspective and how much data is already in the RLC level Tx queue. Again, it may consume time between truly switching from the old xRB (e.g., with the "END" marker) to the new xRB (e.g., with the "START" marker) with the existing DL RAN based RQoS, even though it is a dynamic switching. These unpredictable delays may impact the PDU set timing and signaling in terms of PSDB and PSER, and may ultimately translate into impacts for the user experience.

Various aspects herein may provide UL flexibility for radio bearer mappings in association with QoS flows that enable a UE to quickly and dynamically adapt operations for improved signaling throughput and latency reduction in wireless communication networks. While the network may provide various configurations for QoS flows to the UE, the aspects herein enable the UE to adjust its implemented configurations based on dynamic radio conditions and network traffic, which improves signaling and latency. For example, aspects herein provide for a UE to receive, from a network node (e.g., a base station), a mapping configuration that indicates a configured mapping between a QoS flow and a first UL radio bearer associated with transmission of at least one PDU set. The network node may configure the UE via semi-static RRC signaling, dynamic RQoS, and/or the like. The UE may thus be enabled and configured to switch the QoS flow to map to a second UL radio bearer based on a presence of a condition associated with the transmission of a first PDU set of the at least one PDU set. Likewise, the aspects herein enable a network node (e.g., a base station) to receive, from a UE, a first indication of a UE capability associated with mapping a QoS flow with UL radio bearers for transmission of at least one PDU set. The UE may thus be enabled and configured, based on the first indication of the UE capability, with a mapping configuration that indicates a configured mapping between the QoS flow and a first UL radio bearer associated with transmission of the at least one PDU set.

While various aspects described may be applicable to XR and associated applications, mentioned for descriptive and illustrative purposes, aspects are not so limited and are applicable to other types of applications, traffic, and/or data, as would be understood by persons of skill in the relevant art(s) having the benefit of this disclosure. Additionally, while various illustrated aspects may be described in the context of DRBs, it is contemplated herein that aspects are not so limited and may be applicable to other xRBs.

Figure 4:
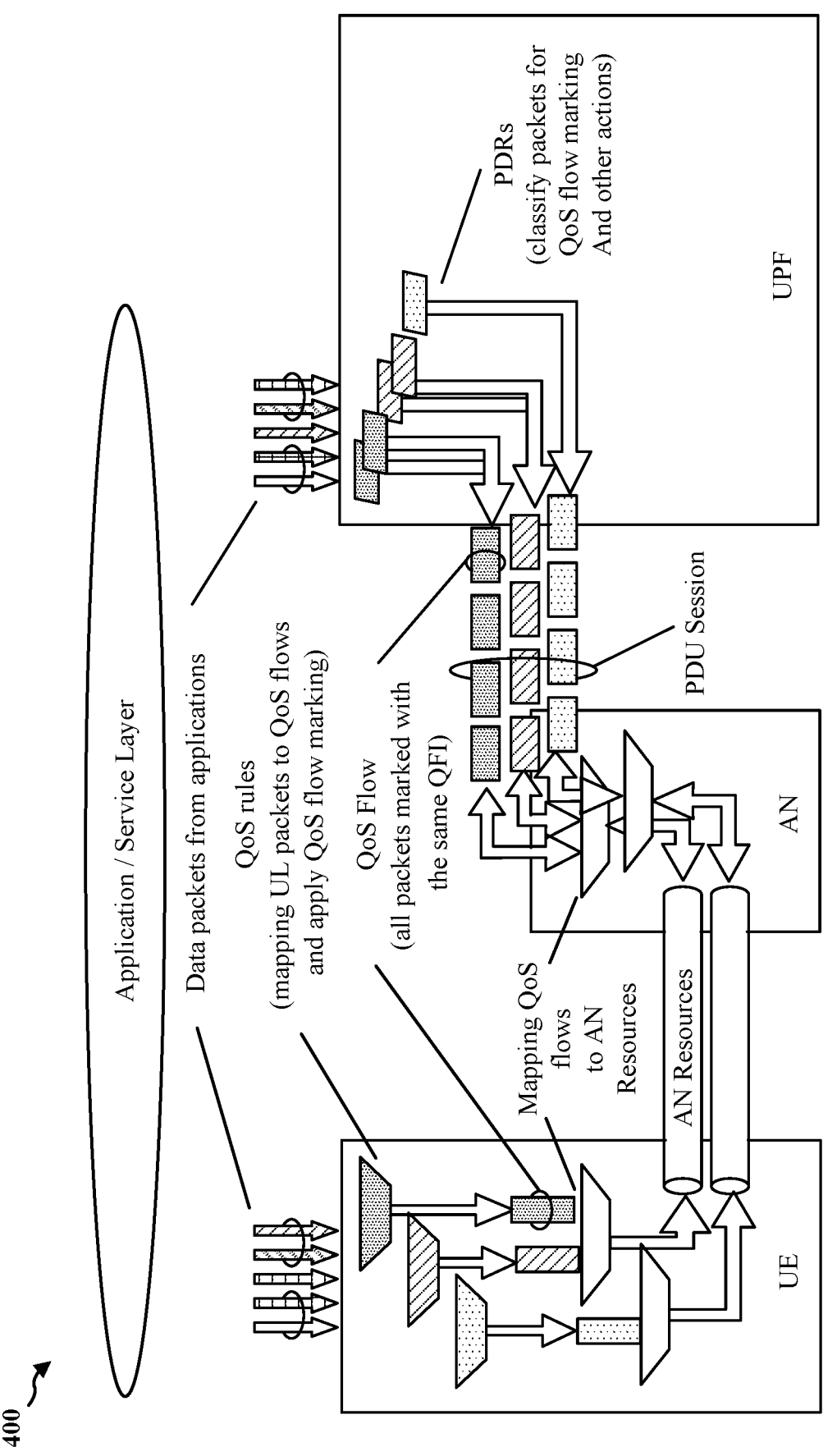
FIG. 4 is a diagram illustrating example mappings of QoS flows across radio bearers, in accordance with various aspects of the present disclosure.

FIG. 4 is a diagram 400 illustrating example mappings of QoS flows across radio bearers, in various aspects. As shown in FIG. 4, various QoS flows may be mapped with different QoS requirements across the bearers. Distinguishing between the bearers that are part of a single slice or different slices may facilitate the support for End-to-End (E2E) Resource management to meet the Service Level Agreements (SLA).

Figure 5:
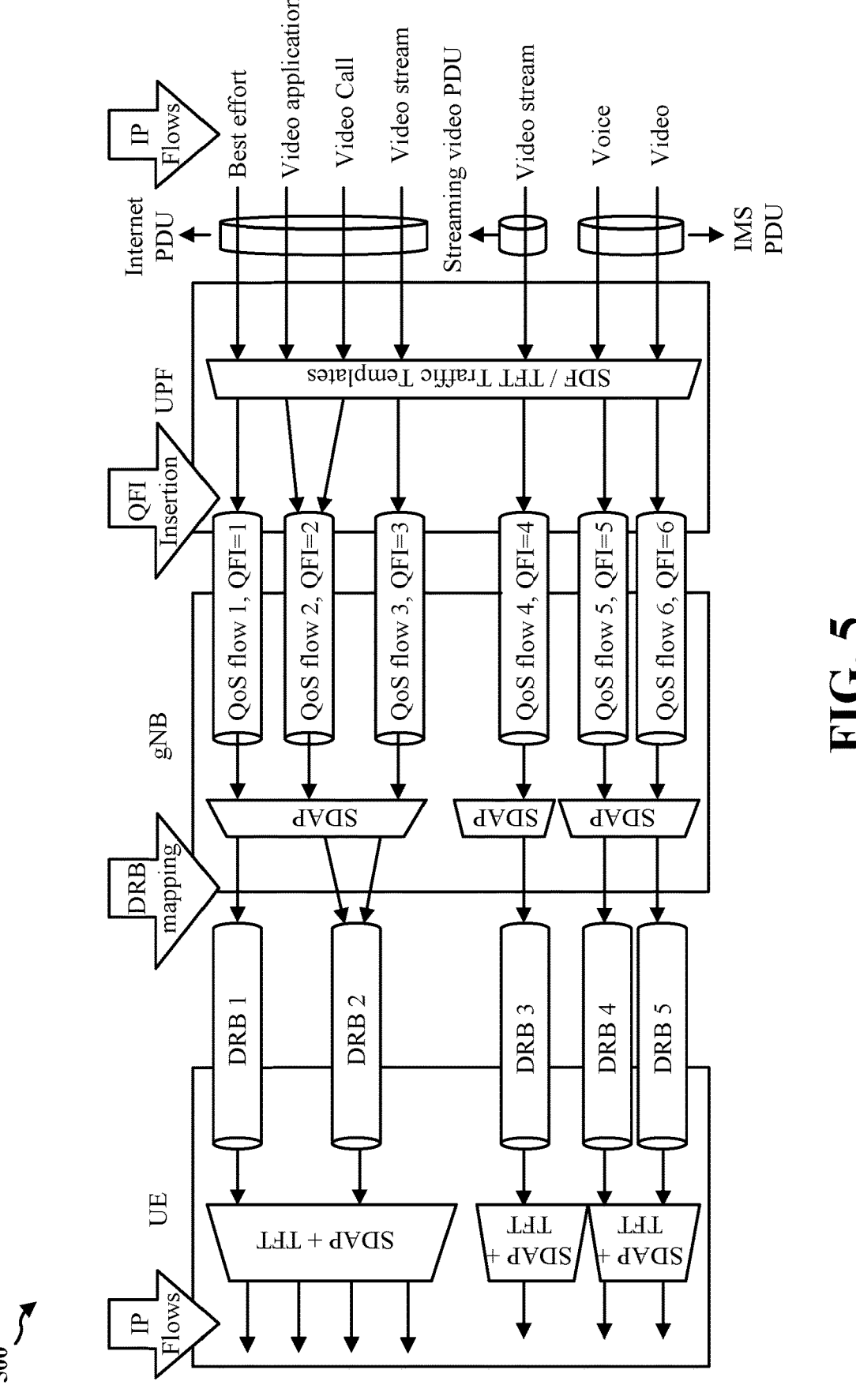
FIG. 5 is a diagram illustrating example mappings among different of QoS flows, radio bearers, service data adaption protocols (SDAPs), and PDU sessions, in accordance with various aspects of the present disclosure.

FIG. 5 is a diagram 500 illustrating example mappings among different flows, RBs, SDAPs, and PDU sessions, in various aspects. As shown in FIG. 5, multiple flows may be mapped to one RB. For example, QoS flows 2 and 3 may be mapped to the same Data Resource Bearer (DRB), such as DRB 2. Multiple RBs may be mapped on the same PDU Session (default and optional dedicated bearers). For example, multiple RBs (e.g., DRB 1 and DRB 2) may be mapped on the same internet PDU session. One SDAP entity may correspond to one PDU session. For example, the internet PDU session, the streaming video PDU session, and the IMS PDU session may each correspond to one SDAP entity.

Figure 6:
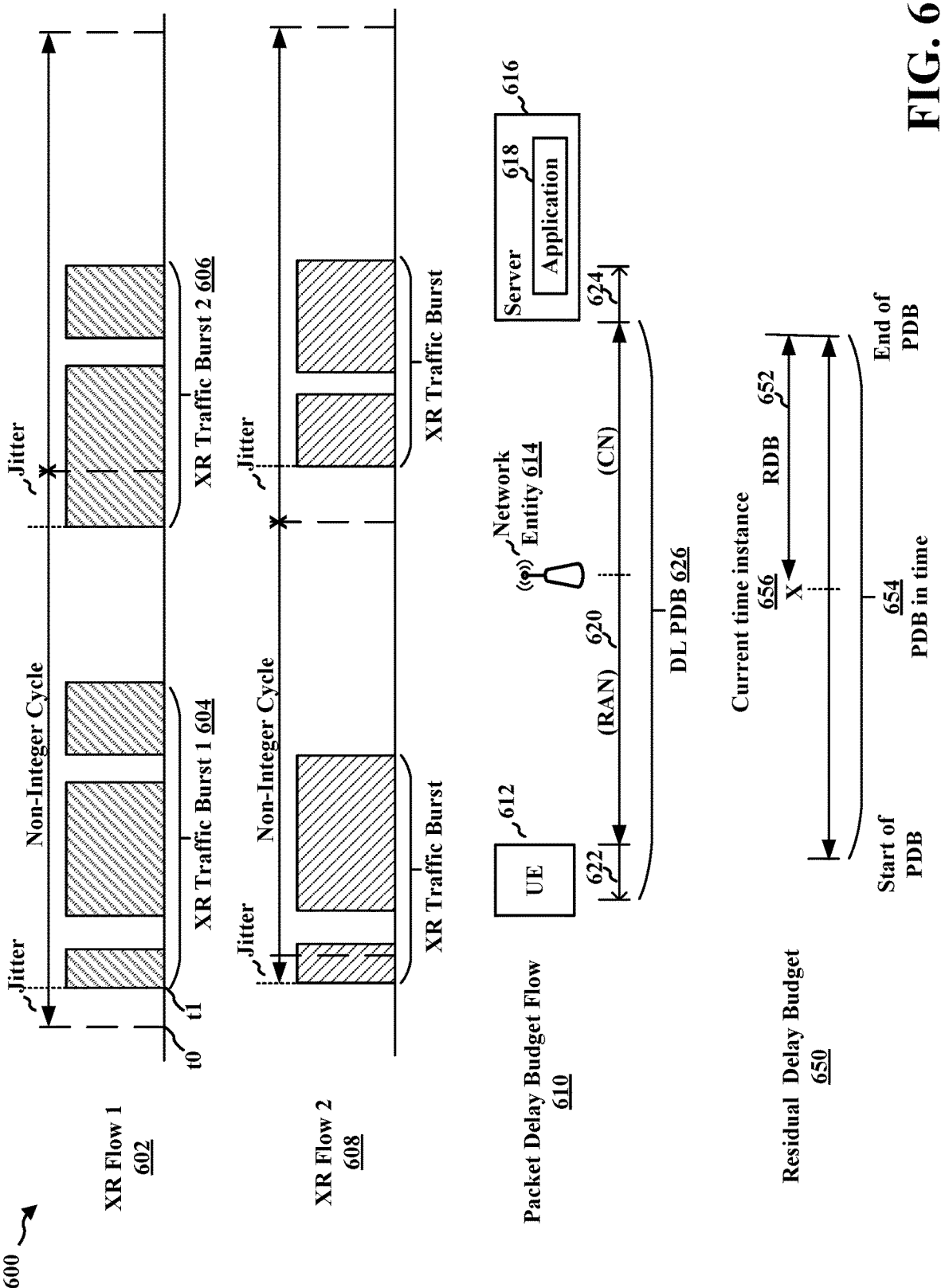
FIG. 6 is a diagram illustrating example extended reality (XR) traffic, in accordance with various aspects of the present disclosure.

FIG. 6 is a diagram 600 illustrating example XR traffic, in various aspects. XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

XR traffic may arrive in periodic traffic bursts ("XR traffic bursts"). An XR traffic burst may vary in a number of packets per burst and/or a size of each pack in the burst. The diagram 600 illustrates a first XR flow 602 that includes a first XR traffic burst 604 and a second XR traffic burst 606. As illustrated in the diagram 600, the traffic bursts may include different numbers of packets, e.g., the first XR traffic burst 604 being shown with three packets (represented as rectangles in the diagram 600) and the second XR traffic burst 606 being shown with two packets. Furthermore, as illustrated in the diagram 600, the three packets in the first XR traffic burst 604 and the two packets in the second XR traffic burst 606 may vary in size, that is, packets within the first XR traffic burst 604 and the second XR traffic burst 606 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in ⅟60=16.67 ms periods. In another example, for 120 FPS video data, XR traffic bursts may arrive in ⅟120=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 602, a UE may expect a first packet of the first XR traffic burst 604 to arrive at time t0, but the first packet of the first XR traffic burst 604 arrives at a time t1, as shown.

XR traffic may include multiple flows that arrive at a UE (or a base station) concurrently with one another (or within a threshold period of time). For instance, the diagram 600 includes a second XR flow 608. The second XR flow 608 may have different characteristics than the first XR flow 602. For instance, the second XR flow 608 may have XR traffic bursts with different numbers of packets, different sizes of packets, etc. In an example, the first XR flow 602 may include video data and the second XR flow 608 may include audio data for the video data. In another example, the first XR flow 602 may include intra-coded picture frames (I-frames) that include complete images and the second XR flow 608 may include predicted picture frames (P-frames) that include changes from a previous image.

As noted herein, XR traffic may have an associated e2e PDB. If a packet does not arrive within the e2e PDB, a UE (or a base station) may discard the packet. In an example, if a packet corresponding to a video frame of a video does not arrive at a UE within an e2e PDB, the UE may discard the packet, as the video has advanced beyond the frame. However, the RDB at the UE may be unaccounted for in consideration of discarding packets. An example time diagram 650 shows a length of time corresponding to a PDB 654. At a particular point in time 656, the residual delay budget 652 is the remaining portion of the PDB 654.

An XR traffic overall PDB may include a portion to allow for communication delay of data (e2e PDB) between a UE and a computing device, e.g., a server, hosting an application, e.g., for XR, and a portion for additional time after the communication delay before the data is discarded, e.g., residual delay (e.g., RDB). For instance, the diagram 600 includes a packet delay budget flow 610. Packet delay budget flow 610 illustrates a UE 612, a network entity 614 (e.g., a base station or portion thereof), and a server 616 that hosts an application 618. In the illustrated aspect, a communication delay 620 is shown as including a RAN portion between the UE 612 and the network entity 614, as well as a CN portion between the network entity 614 and the server 616. The communication delay 620 may apply to both UL and DL communications. Additionally, a residual delay 622 is shown at the UE 612 for DL communications and a residual delay 624 is shown at the server 616 for UL communications. The communication delay 620 and the residual delay 622 may make up an overall PDB for DL XR communications, e.g., DL PDB 626. Likewise, the communication delay 620 and the residual delay 624 may make up an overall PDB for UL XR communications (not shown for illustrative clarity).

In general, XR traffic may be characterized by relatively high data rates and low latency. The latency in XR traffic may affect the user experience. For instance, XR traffic may have applications in eMBB and URLLC services.

Figure 7:
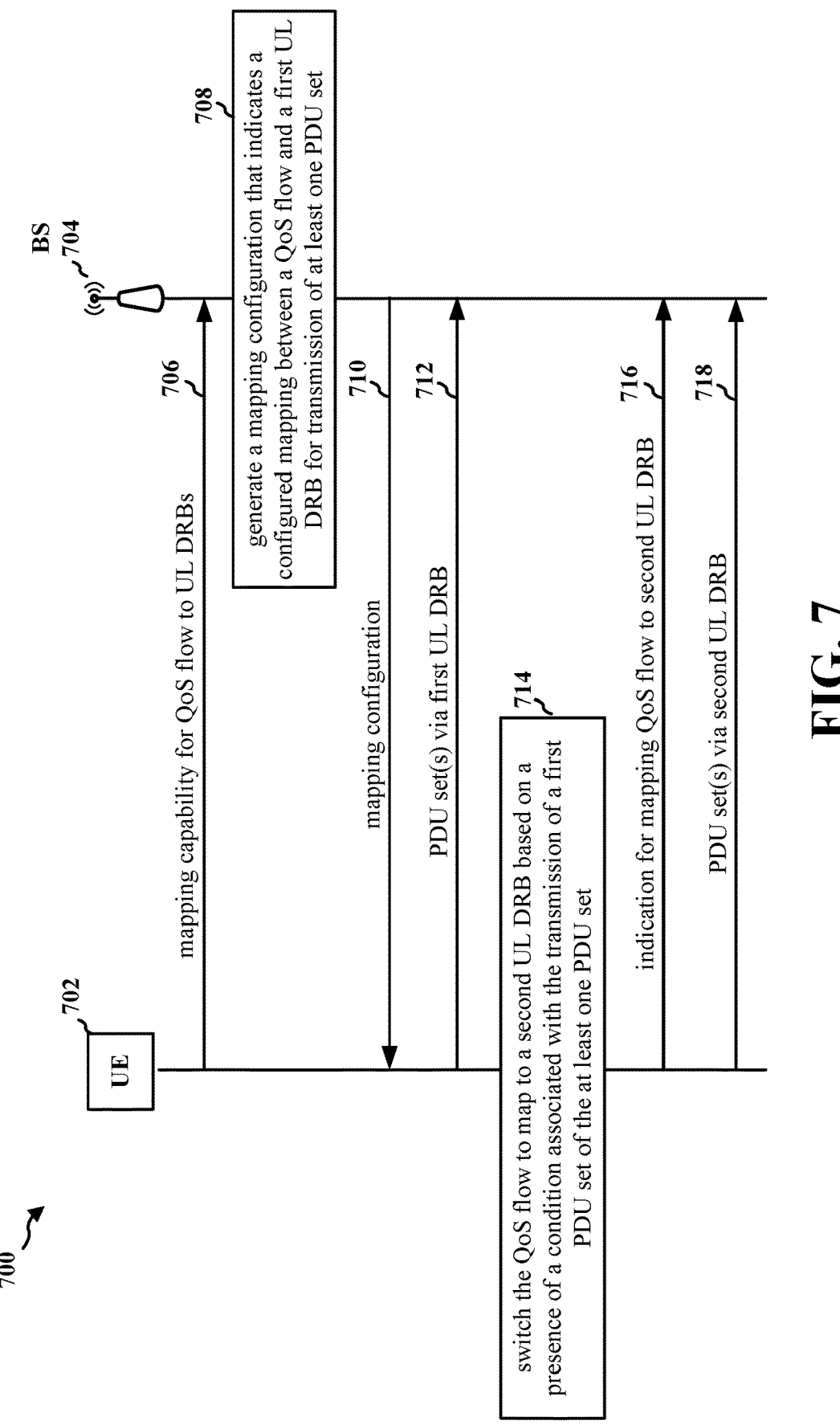
FIG. 7 is a call flow diagram for wireless communications, in accordance with various aspects of the present disclosure.

FIG. 7 is a call flow diagram 700 for wireless communications, in various aspects. Call flow diagram 700 illustrates configurations for uplink PDU sets and reflective QoS in radio access networks by a UE (e.g., a UE 702) that may communicate with a network node (a base station 704, such as a gNB or other type of base station, by way of example, as shown). Aspects described for the base station 704 may be performed by the base station in aggregated form and/or by one or more components of the base station 704 in disaggregated form. Additionally, or alternatively, the aspects may be performed by the UE 702 autonomously, in addition to, and/or in lieu of, operations of the base station 704.

In the illustrated aspect, the UE 702 may provide, to the base station 704, a mapping capability 706 for one or more QoS flows to one or more UL DRBs. That is, the UE 702 may provide or transmit, and the base station 704 may receive, a first indication of a UE capability associated with mapping a QoS flow with UL radio bearers for transmission of at least one PDU set. In aspects, the mapping capability 706 may indicate that the UE 702 is capable of mapping a given QoS flow to a single UL DRB, or a given QoS flow to more than one UL DRB, e.g., a one-to-N model, wherein N is a positive integer of more than one. If N is one or more, then the indication of support for a one-to-N model enables the UE to indicate support for a one-to-one mapping or to a mapping of a single QoS flow to multiple UL DRBs.

Based on the mapping capability 706 supported by the UE, the base station 704 may generate, at 708, a mapping configuration 710 that indicates a configured mapping between a QoS flow and a first UL DRB for transmission of at least one PDU set. In aspects, the mapping configuration 710 may include a one-to-one mapping or a one-to-many mapping. In one example for a one-to-many mapping for the mapping configuration 710, a default mapping for a QFI of the configured QoS flow to an xRB (e.g., a first DRB) may be included, where the default radio bearer may be associated with network handover operations for the UE 702, and one or more optional or conditional mappings for different xRBs (e.g., a second DRB, a third DRB, and/or the like) may also be included for the mapping configuration 710. In aspects, the one or more optional or conditional mappings for different xRBs may be included in a QoS information element (IE) of the mapping configuration 710. It should be noted that while the mapping configuration 710 may include one or more xRBs for optional, one-to-many mappings, at any given time, a QoS flow is mapped to one xRB.

The base station 704 may provide or transmit, and the UE 702 may receive, the mapping configuration 710. In aspects the mapping configuration 710 may be provided/transmitted and/or received via at least one of RRC signaling, PDCP signaling, SDAP signaling, or a MAC-CE. The UE 702 may thus be configured with the mapping configuration 710, and in the illustrated example, the UE 702 has its QoS flow for PDU set transmission(s) mapped to a first UL DRB. The UE 702 may be configured to provide or transmit one or more PDUs of the PDU set(s) 712 to the base station 704 via the first UL DRB. The one or more PDUs may be a PDU set or a portion of PDUs thereof, in aspects. The transmission of the one or more PDUs of the PDU set(s) 712 to the base station 704 via the first UL DRB may be based on an absence of a condition associated with the transmission of the one or more PDUs of the PDU set(s) 712. In aspects, the criteria for the condition associated with the transmission of the one or more PDUs of the PDU set(s) 712 may include, without limitation, an expiration of a PSDB, a measure of a PSER that meets a PSER threshold, a scheduling delay associated with the first UL radio bearer that meets a scheduling threshold, a cell reselection hysteresis characteristic, a block error rate BLER associated with the first UL radio bearer that meets a BLER threshold, and/or the like.

The UE 702 may switch, at 714, the QoS flow to map to a second UL radio bearer based on a presence of the condition associated with the transmission of a PDU set, or a portion of PDUs thereof, of the PDU set(s) 712. That is, the UE 702 may obtain and/or determine the presence of the condition associated with the transmission of the one or more PDUs of the PDU set(s) 712 (e.g., an expiration of a PSDB, a measure of a PSER that meets a PSER threshold, a scheduling delay associated with the first UL radio bearer that meets a scheduling threshold, a cell reselection hysteresis characteristic, a block error rate BLER associated with the first UL radio bearer that meets a BLER threshold, and/or the like), and in response, autonomously switch (at 714) the QoS flow for the UE 702 to a different xRB (e.g., a second UL DRB, as shown in the illustrated example).

The UE 702 may provide or transmit to the base station 704 an indication 716 for switching (at 714) the mapping of the QoS flow to the different xRB (e.g., to the second UL DRB, as shown in the illustrated example). In one aspect, the indication 716 may be a transmission of an end marker associated with a first identifier for the first UL radio bearer via the first UL radio bearer (e.g., the default xRB), and a transmission via the second UL radio bearer (e.g., the mapped xRB associated with the switch at 714) that includes at least one of a start marker associated with a second identifier for the second UL radio bearer or a new data transmission. The UE 702 may then be configured to provide or transmit one or more PDUs of PDU set(s) 718 to the base station 704 via the second UL DRB, as in the illustrated example. The one or more PDUs may be a PDU set or a portion of PDUs thereof, in aspects. The transmission of the one or more PDUs of the PDU set(s) 718 to the base station 704 via the second UL DRB may be based on an absence of a condition associated with the transmission of the one or more PDUs of the PDU set(s) 718, e.g., similar to the condition described above for the one or more PDUs of the PDU set(s) 712. In aspects, the one or more PDUs of the PDU set(s) 718 may be a continuance of the new data transmission of the indication 716.

Figure 8:
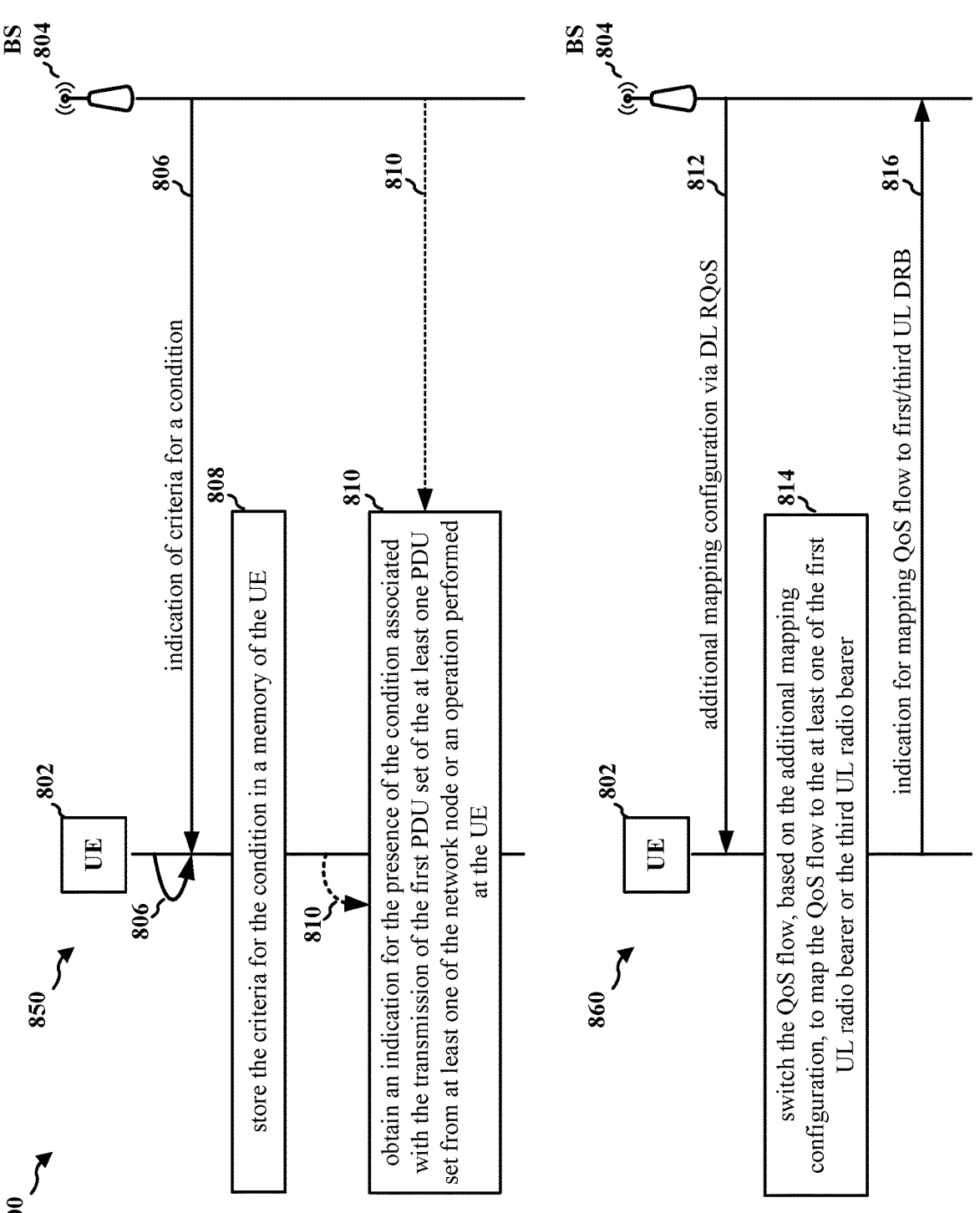
FIG. 8 shows call flow diagrams for wireless communications, in accordance with various aspects of the present disclosure.

FIG. 8 is a diagram 800 for wireless communications, in various aspects. Diagram 800 illustrates two example configurations for call flow diagrams: a call flow diagram 850 and a call flow diagram 860, which illustrate configurations for uplink PDU sets and reflective QoS in radio access networks. Call flow diagrams 850, 860 may be performed by a UE (e.g., a UE 802) that may communicate with a network node (a base station 804, such as a gNB or other type of base station, by way of example, as shown). Aspects described for the base station 804 may be performed by the base station in aggregated form and/or by one or more components of the base station 804 in disaggregated form. Additionally, or alternatively, the aspects may be performed by the UE 802 autonomously, in addition to, and/or in lieu of, operations of the base station 804. UE 802 and base station 804 may be further aspects of UE 702 and base station 704 of FIG. 7.

In the illustrated aspect for call flow diagram 850, the UE 802 may obtain an indication of criteria 806 for a condition associated with the transmission of one or more PDUs of the PDU set(s) for a QoS flow that is mapped to a given radio bearer, e.g., similar to the conditions described above for the one or more PDUs of the PDU set(s) 712, 718 in FIG. 7. In one configuration, the UE 802 may receive, from the base station 804, the indication of criteria 806 for the condition via at least one of RRC signaling, PDCP signaling, RLC signaling, or MAC-CE. In one configuration, the UE 802 may determine the indication of criteria 806 for the condition based on implementation options/choices of the UE 802. These configurations may not be mutually exclusive, in aspects, and may be utilized together, in whole or in part, or separately. In aspects, the indication of criteria 806 for the condition may be provided as a portion of the mapping configuration 710 in FIG. 7.

At 808, the UE 802 may store the criteria, from the indication of criteria 806, for the condition in a memory of the UE 802, as described herein. The criteria stored at 808 may be utilized for implementation of uplink PDU sets and reflective QoS in radio access networks, according to aspects herein. At 810, the UE 802 may obtain an indication for the presence of the condition associated with the transmission of a PDU set (e.g., the first PDU set, as described above) of the PDU set(s) from the base station 804 and/or an operation performed at the UE 802. That is, the UE 802 may obtain at 810 (via reception and/or determination) an indication of the presence of the condition associated with the transmission of the one or more PDUs of the PDU set(s) as, without limitation, an expiration of a PSDB, a measure of a PSER that meets a PSER threshold, a scheduling delay associated with the first UL radio bearer that meets a scheduling threshold, a cell reselection hysteresis characteristic, a block error rate BLER associated with the first UL radio bearer that meets a BLER threshold, and/or the like. In response to obtaining (at 810) the indication of the presence of the condition, the UE 802 may be configured to autonomously switch (e.g., 714 in FIG. 7) the QoS flow for the UE 802 to a different xRB.

In the illustrated aspect for call flow diagram 850, the UE 802 may obtain an additional mapping configuration 812 that indicates an additional configured mapping between the QoS flow and an xRB. In aspects, the base station 804 may provide the additional mapping configuration 812 via a DL RQoS process. Referring back to the example illustrated in FIG. 7, a UE may switch the mapping of a QoS flow from a first radio bearer (e.g., a default xRB) to a second radio bearer based on a condition associated with transmission of PDU(s). In operations where the QoS flow of the UE is mapped to the second radio bearer, the additional mapping configuration 812 described here for FIG. 8 and call flow diagram 860 may configure the UE 802 to switch the QoS flow mapping from the second UL radio bearer back to the first UL radio bearer or to a third UL radio bearer.

The UE 802 may provide or transmit to the base station 804 an indication 816 for switching (at 814) the mapping of the QoS flow to the different xRB (e.g., back to a first UL xRB or to a third UL xRB). In one aspect, the indication 816 may be a transmission of an end marker associated with a second identifier for the second UL radio bearer via the second UL radio bearer, and a transmission via the first or third UL radio bearer (e.g., the mapped xRB associated with the switch at 814) that includes at least one of a start marker associated with a first or third identifier for the first or third UL radio bearer or a new data transmission. The UE 802 may then be configured to provide or transmit one or more PDUs of PDU set(s) to the base station 804 via the first or third UL radio bearer.

FIG. 9 is a flowchart 900 of a method of wireless communication, in various aspects. The method may be performed by a UE (e.g., the UE 104, 612, 702, 802; the apparatus 1104). In some aspects, the method may include aspects described in connection with the communication flow in FIG. 7 and/or aspects described in FIGS. 4-6, 8. The method provides for configuring uplink PDU sets and reflective QoS in radio access networks that enables a UE to configure mappings between QoS flows and radio bearers, providing UL flexibility for radio bearer mappings in association with QoS flows that enables a UE to quickly and dynamically adapt operations for improved signaling throughput and latency reduction in wireless communication networks.

At 902, the UE receives, from a network node, a mapping configuration that indicates a configured mapping between a QoS flow and a first UL radio bearer, where the first UL radio bearer is associated with transmission of at least one PDU set. As an example, the reception may be performed by the component 198. FIGS. 7, 8 illustrate an example of the UE 702 performing such reception for a mapping configuration from a network node (e.g., the base station 704).

For instance, the UE 702 may be configured to provide, to the base station 704, a mapping capability 706 for one or more QoS flows to one or more UL DRBs. That is, the UE 702 may be configured to provide or transmit, and the base station 704 may be configured to receive, a first indication of a UE capability associated with mapping a QoS flow with UL radio bearers for transmission of at least one PDU set. In aspects, the mapping capability 706 may indicate that the UE 702 is capable of mapping a given QoS flow to a single UL DRB, or a given QoS flow to more than one UL DRB, e.g., a one-to-N model. Based on the mapping capability 706, the base station 704 may be configured to generate, at 708, a mapping configuration 710 that indicates a configured mapping between a QoS flow and a first UL DRB for transmission of at least one PDU set. In aspects, the mapping configuration 710 may include a one-to-one mapping or a one-to-many mapping. In one example for a one-to-many mapping for the mapping configuration 710, a default mapping for a QFI of the configured QoS flow to an xRB (e.g., a first DRB) may be included, where the default radio bearer may be associated with network handover operations for the UE 702, and one or more optional or conditional mappings for different xRBs (e.g., a second DRB, a third DRB, and/or the like) may also be included for the mapping configuration 710. In aspects, the one or more optional or conditional mappings for different xRBs may be included in a QoS information element (IE) of the mapping configuration 710. It should be noted that while the mapping configuration 710 may include one or more xRBs for optional, one-to-many mappings, at any given time, a QoS flow is mapped to one xRB. The base station 704 may be configured to provide or transmit, and the UE 702 may be configured to receive, the mapping configuration 710. In aspects the mapping configuration 710 may be provided/transmitted and/or received via at least one of RRC signaling, PDCP signaling, SDAP signaling, or a MAC-CE. The UE 702 may thus be configured with the mapping configuration 710, and in the illustrated example, the UE 702 has its QoS flow for PDU set transmission(s) mapped to a first UL DRB. The UE 702 may be configured to provide or transmit one or more PDUs of the PDU set(s) 712 to the base station 704 via the first UL DRB. The one or more PDUs may be a PDU set or a portion of PDUs thereof, in aspects. The transmission of the one or more PDUs of the PDU set(s) 712 to the base station 704 via the first UL DRB may be based on an absence of a condition associated with the transmission of the one or more PDUs of the PDU set(s) 712. In aspects, the criteria (e.g., 806 in FIG. 8) for the condition associated with the transmission of the one or more PDUs of the PDU set(s) 712 may include, without limitation, an expiration of a PSDB, a measure of a PSER that meets a PSER threshold, a scheduling delay associated with the first UL radio bearer that meets a scheduling threshold, a cell reselection hysteresis characteristic, a block error rate BLER associated with the first UL radio bearer that meets a BLER threshold, and/or the like.

At 904, the UE switches the QoS flow to map to a second UL radio bearer based on a presence of a condition associated with the transmission of a first PDU set of the at least one PDU set. As an example, the switching may be performed by the component 198. FIGS. 7, 8 illustrate an example of the UE 702 performing such a switch for a QoS flow to map to a different UL radio bearer for communication of PDU sets to a network node (e.g., the base station 704).

For instance, the UE 702 may be configured to switch, at 714, the QoS flow to map to a second UL radio bearer based on a presence of the condition (e.g., 810 in FIG. 8) associated with the transmission of a PDU set, or a portion of PDUs thereof, of the PDU set(s) 712. That is, the UE 702 may obtain and/or determine the presence of the condition (e.g., 810 in FIG. 8) associated with the transmission of the one or more PDUs of the PDU set(s) 712 (e.g., an expiration of a PSDB, a measure of a PSER that meets a PSER threshold, a scheduling delay associated with the first UL radio bearer that meets a scheduling threshold, a cell reselection hysteresis characteristic, a block error rate BLER associated with the first UL radio bearer that meets a BLER threshold, and/or the like), and in response, autonomously switch (at 714) the QoS flow for the UE 702 to a different xRB (e.g., a second UL DRB, as shown in the illustrated example). The UE 702 may be configured to provide or transmit to the base station 704 an indication 716 for switching (at 714) the mapping of the QoS flow to the different xRB (e.g., to the second UL DRB, as shown in the illustrated example). In one aspect, the indication 716 may be a transmission of an end marker associated with a first identifier for the first UL radio bearer via the first UL radio bearer (e.g., the default xRB), and a transmission via the second UL radio bearer (e.g., the mapped xRB associated with the switch at 714) that includes at least one of a start marker associated with a second identifier for the second UL radio bearer or a new data transmission. The UE 702 may then be configured to provide or transmit one or more PDUs of PDU set(s) 718 to the base station 704 via the second UL DRB, as in the illustrated example. The one or more PDUs may be a PDU set or a portion of PDUs thereof, in aspects. The transmission of the one or more PDUs of the PDU set(s) 718 to the base station 704 via the second UL DRB may be based on an absence of a condition associated with the transmission of the one or more PDUs of the PDU set(s) 718, e.g., similar to the condition described above for the one or more PDUs of the PDU set(s) 712. In aspects, the one or more PDUs of the PDU set(s) 718 may be a continuance of the new data transmission of the indication 716.

FIG. 10 is a flowchart 1000 of a method of wireless communication, in various aspects. The method may be performed by a base station (e.g., the base station 102, 704, 804; the network entity 614, 1102, 1202, 1260. In some aspects, the method may include aspects described in connection with the communication flow in FIG. 7 and/or aspects described in FIGS. 4-6, 8. The method provides for configuring uplink PDU sets and reflective QoS in radio access networks that enables a UE to configure mappings between QoS flows and radio bearers, providing UL flexibility for radio bearer mappings in association with QoS flows that enables a UE to quickly and dynamically adapt operations for improved signaling throughput and latency reduction in wireless communication networks.

At 1002, the base station receives, from a UE, a first indication of a UE capability associated with mapping a QoS flow with UL radio bearers for transmission of at least one PDU set. As an example, the reception may be performed by the component 199. FIGS. 7, 8 illustrate an example of the base station 704 performing such reception for a mapping capability from a UE (e.g., the UE 702).

For instance, the UE 702 may be configured to provide, and the base station 704 may be configured to receive, a mapping capability 706 for one or more QoS flows to one or more UL DRBs. That is, the UE 702 may be configured to provide or transmit, and the base station 704 may be configured to receive, a first indication of a UE capability associated with mapping a QoS flow with UL radio bearers for transmission of at least one PDU set. In aspects, the mapping capability 706 may indicate that the UE 702 is capable of mapping a given QoS flow to a single UL DRB, or a given QoS flow to more than one UL DRB, e.g., a one-to-N model.

At 1004, the base station configures the UE, based on the first indication of the UE capability, with a mapping configuration that indicates a configured mapping between the QoS flow and a first UL radio bearer, where the first UL radio bearer is associated with transmission of at least one PDU set. As an example, the reception may be performed by the component 199. FIGS. 7, 8 illustrate an example of the base station 704 performing such configuring of a mapping configuration for a UE (e.g., the UE 702).

Based on the mapping capability 706, the base station 704 may be configured to generate, at 708, a mapping configuration 710 that indicates a configured mapping between a QoS flow and a first UL DRB for transmission of at least one PDU set. In aspects, the mapping configuration 710 may include a one-to-one mapping or a one-to-many mapping. In one example for a one-to-many mapping for the mapping configuration 710, a default mapping for a QFI of the configured QoS flow to an xRB (e.g., a first DRB) may be included, where the default radio bearer may be associated with network handover operations for the UE 702, and one or more optional or conditional mappings for different xRBs (e.g., a second DRB, a third DRB, and/or the like) may also be included for the mapping configuration 710. In aspects, the one or more optional or conditional mappings for different xRBs may be included in a QoS information element (IE) of the mapping configuration 710. It should be noted that while the mapping configuration 710 may include one or more xRBs for optional, one-to-many mappings, at any given time, a QoS flow is mapped to one xRB. The base station 704 may be configured to provide or transmit, and the UE 702 may be configured to receive, the mapping configuration 710. In aspects the mapping configuration 710 may be provided/transmitted and/or received via at least one of RRC signaling, PDCP signaling, SDAP signaling, or a MAC-CE. The UE 702 may thus be configured with the mapping configuration 710, and in the illustrated example, the UE 702 has its QoS flow for PDU set transmission(s) mapped to a first UL DRB. The UE 702 may be configured to provide or transmit one or more PDUs of the PDU set(s) 712 to the base station 704 via the first UL DRB. The one or more PDUs may be a PDU set or a portion of PDUs thereof, in aspects.

Figure 11:
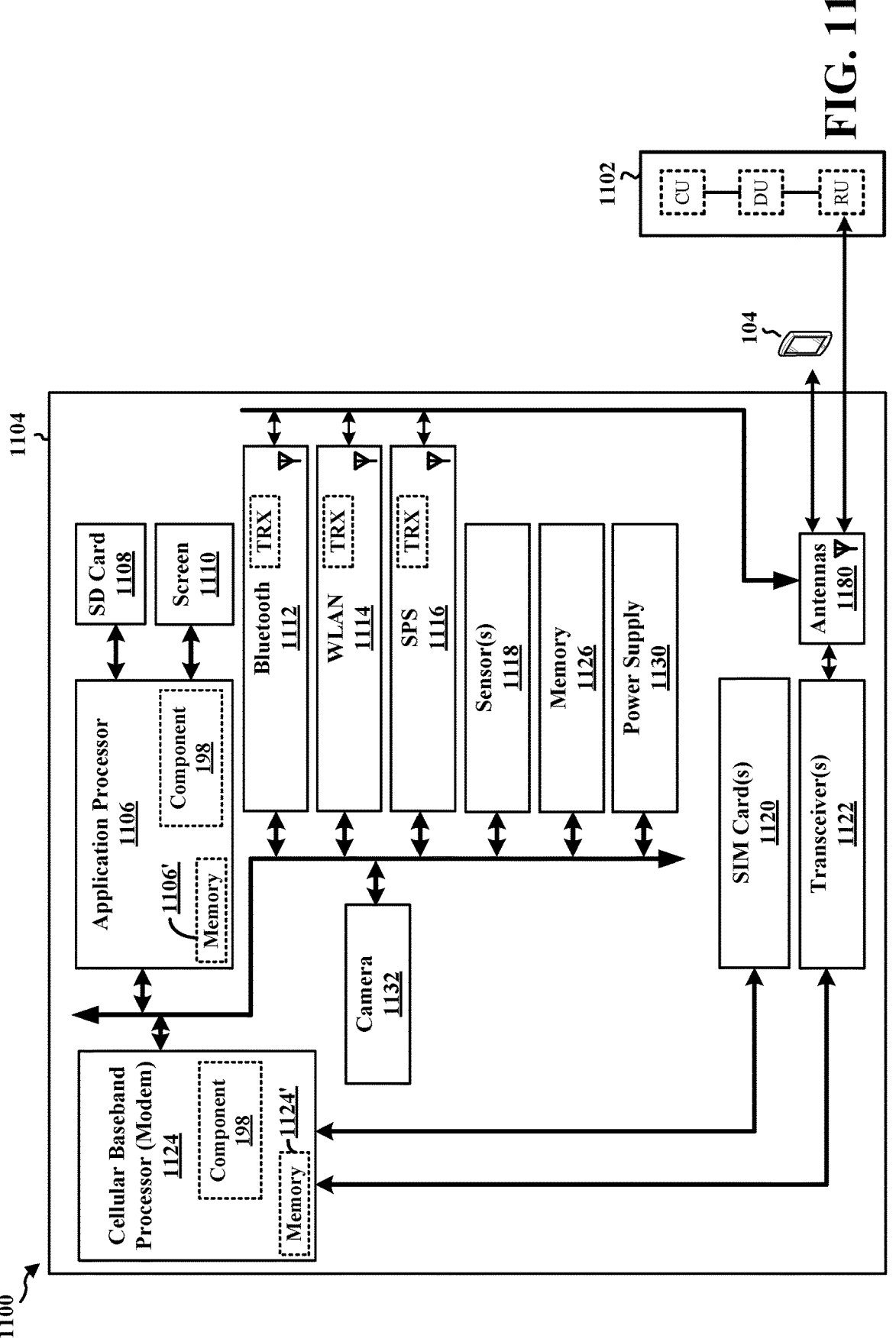
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers

1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see UE 350 of FIG. 3) and include the additional modules of the apparatus 1104.

As discussed supra, the component 198 may be configured to receive, from a network node, a mapping configuration that indicates a configured mapping between a QoS flow and a first UL radio bearer, where the first UL radio bearer is associated with transmission of at least one PDU set. The component 198 may be configured to switch the QoS flow to map to a second UL radio bearer based on a presence of a condition associated with the transmission of a first PDU set of the at least one PDU set. The component 198 may be configured to transmit, to the network node and prior to switching the QoS flow to map to the second UL radio bearer, one or more PDUs of the at least one PDU set via the first UL radio bearer based on an absence of the condition. The component 198 may be configured to obtain an indication for the presence of the condition associated with the transmission of the first PDU set of the at least one PDU set from at least one of the network node or an operation performed at the UE. The component 198 may be configured to receive, from the network node, an indication of criteria for the condition via at least one of RRC signaling, PDCP signaling, RLC signaling, or a MAC-CE. The component 198 may be configured to store the criteria for the condition in a memory of the UE. The component 198 may be configured to transmit, for the network node, an end marker associated with a first identifier for the first UL radio bearer via the first UL radio bearer, and to transmit, for the network node and via the second UL radio bearer, at least one of: a start marker associated with a second identifier for the second UL radio bearer, or a new data transmission. The component 198 may be configured to receive, from the network node via a DL reflective QoS process, an additional mapping configuration that indicates an additional config-ured mapping between the QoS flow and at least one of the first UL radio bearer or a third UL radio bearer, and to switch the QoS flow, based on the additional mapping configura-tion, to map the QoS flow to the at least one of the first UL radio bearer or the third UL radio bearer. The component 198 may be further configured to perform any of the aspects described in connection with the flowchart in any of FIGS. 9, 10, and/or any of the aspects performed by the UE in any of FIGS. 4-8. The component 198 may be within the cellular baseband processor 1124, the application processor 1106, or both the cellular baseband processor 1124 and the applica-tion processor 1106. The component 198 may be one or more hardware components specifically configured to carry out the stated processes/algorithm, implemented by one or more processors configured to perform the stated processes/algorithm, stored within a computer-readable medium for implementation by one or more processors, or some com-bination thereof. As shown, the apparatus 1104 may include a variety of components configured for various functions. In one configuration, the apparatus 1104, and in particular the cellular baseband processor 1124 and/or the application processor 1106, may include means for receiving, from a network node, a mapping configuration that indicates a configured mapping between a QoS flow and a first UL radio bearer, where the first UL radio bearer is associated with transmission of at least one PDU set. In the configuration, the apparatus 1104, and in particular the cellular baseband processor 1124 and/or the application processor 1106, may include means for switching the QoS flow to map to a second UL radio bearer based on a presence of a condition associated with the transmission of a first PDU set of the at least one PDU set. In one configuration, the apparatus 1104, and in particular the cellular baseband processor 1124 and/or the application processor 1106, may include means for transmitting, to the network node and prior to switching the QoS flow to map to the second UL radio bearer, one or more PDUs of the at least one PDU set via the first UL radio bearer based on an absence of the condition. In one configuration, the apparatus 1104, and in particular the cellular baseband processor 1124 and/or the application processor 1106, may include means for obtaining an indication for the presence of the condition associated with the transmission of the first PDU set of the at least one PDU set from at least one of the network node or an operation performed at the UE. In one configuration, the apparatus 1104, and in particular the cellular baseband processor 1124 and/or the application processor 1106, may include means for receiving, from the network node, an indication of criteria for the condition via at least one of RRC signaling, PDCP signaling, RLC signaling, or a MAC-CE. In one configuration, the apparatus 1104, and in particular the cellular baseband processor 1124 and/or the application processor 1106, may include means for storing the criteria for the condition in a memory of the UE. In one configuration, the apparatus 1104, and in par-ticular the cellular baseband processor 1124 and/or the application processor 1106, may include means for trans-mitting, for the network node, an end marker associated with a first identifier for the first UL radio bearer via the first UL radio bearer, and for transmitting, for the network node and via the second UL radio bearer, at least one of: a start marker associated with a second identifier for the second UL radio bearer, or a new data transmission. In one configuration, the apparatus 1104, and in particular the cellular baseband processor 1124 and/or the application processor 1106, may include means for receiving, from the network node via a DL reflective QoS process, an additional mapping configu-ration that indicates an additional configured mapping between the QoS flow and at least one of the first UL radio bearer or a third UL radio bearer, and to switch the QoS flow, based on the additional mapping configuration, to map the QoS flow to the at least one of the first UL radio bearer or the third UL radio bearer. The apparatus may further include means for performing any of the aspects described in connection with the flowchart in any of FIGS. 9, 10, and/or any of the aspects performed by the UE in any of FIGS. 4-8. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
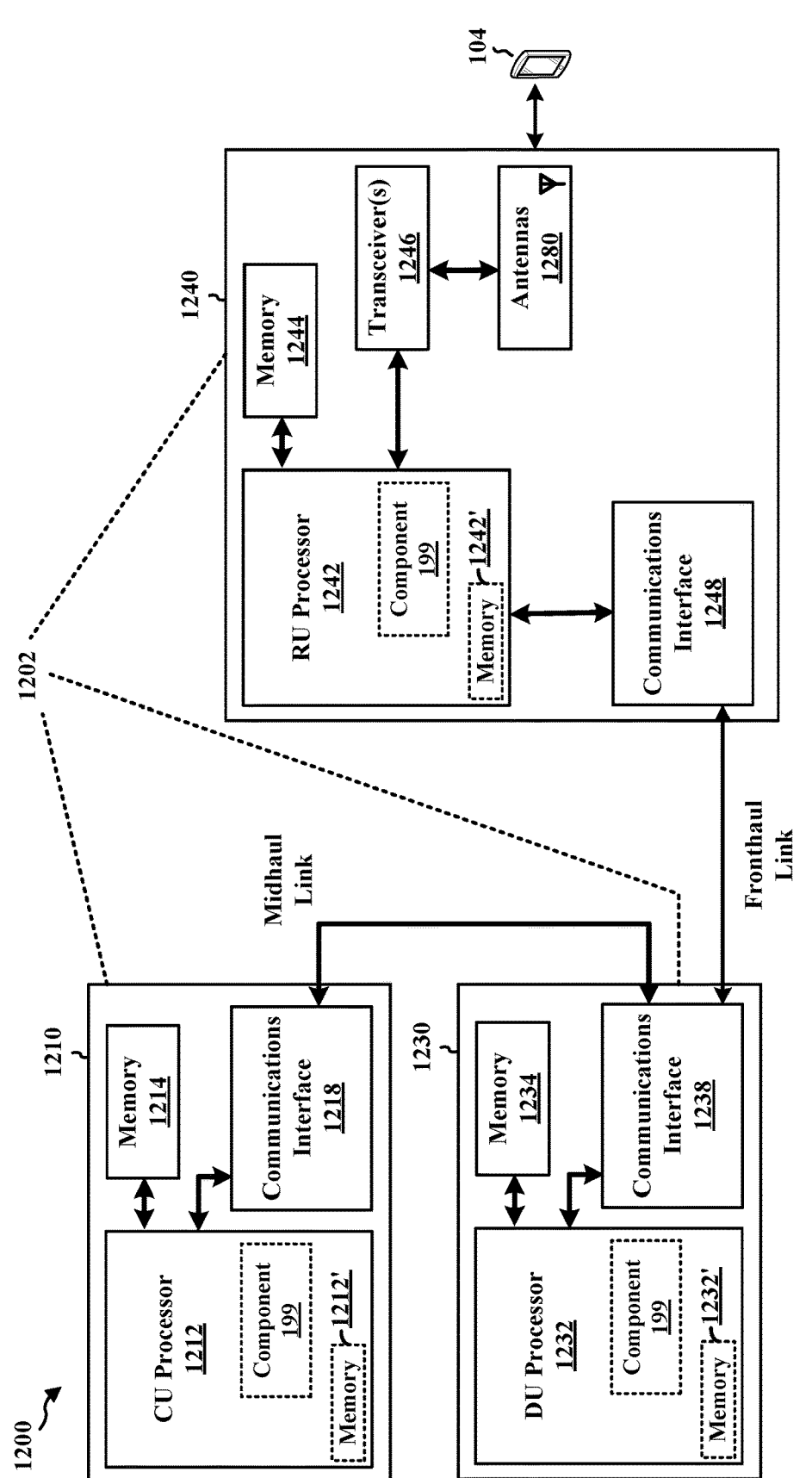
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory mod-ules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a com-puter-readable medium/memory. Each computer-readable medium/memory may be non-transitory. Each of the pro-cessors 1212, 1232, 1242 is responsible for general process-ing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a UE, a first indication of a UE capability associated with mapping a QoS flow with UL radio bearers for transmission of at least one PDU set. The component 199 may be configured to configure the UE, based on the first indication of the UE capability, with a mapping configuration that indicates a configured mapping between the QoS flow and a first UL radio bearer, where the first UL radio bearer is associated with transmission of at least one PDU set. The component 199 may, where the mapping configuration further indicates at least one conditional mapping between the QoS flow and at least one additional UL radio bearer, where the at least one conditional mapping is included in a QoS IE, be configured to receive, from the UE, a second indication that the UE has switched the QoS flow to map to a second UL radio bearer based on a presence of a condition associated with the transmission of a first PDU set of the at least one PDU set, where the second UL radio bearer is one of the UL radio bearers. The component 199 may be configured to receive, from the UE and prior to receiving the second indication, one or more PDUs of the at least one PDU set via the first UL radio bearer based on an absence of the condition. The component 199 may be configured to provide, for the UE, a third indication for the presence of the condition associated with the transmission of the first PDU set of the at least one PDU set. The component 199 may be configured to provide, for the UE, a fourth indication of criteria for the condition via at least one of RRC signaling, PDCP signaling, RLC signaling, or a MAC-CE. The component 199 may be configured to receive, from the UE, an end marker associated with a first identifier for the first UL radio bearer via the first UL radio bearer, and to receive, from the UE and via the second UL radio bearer, at least one of: a start marker associated with a second identifier for the second UL radio bearer, or a new data transmission. The component 199 may be further configured to perform any of the aspects described in connection with the flowchart in any of FIGS. 9, 10, and/or any of the aspects performed by the network node or base station in any of FIGS. 4-8. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 may include means for receiving, from a UE, a first indication of a UE capability associated with mapping a QoS flow with UL radio bearers for transmission of at least one PDU set. In the configuration, the network entity 1202 may include means for configuring the UE, based on the first indication of the UE capability, with a mapping configuration that indicates a configured mapping between the QoS flow and a first UL radio bearer, where the first UL radio bearer is associated with transmission of at least one PDU set. In one configuration, where the mapping configuration further indicates at least one conditional mapping between the QoS flow and at least one additional UL radio bearer, where the at least one conditional mapping is included in a QoS IE, the network entity 1202 may include means for receiving, from the UE, a second indication that the UE has switched the QoS flow to map to a second UL radio bearer based on a presence of a condition associated with the transmission of a first PDU set of the at least one PDU set, where the second UL radio bearer is one of the UL radio bearers. In one configuration, the network entity 1202 may include means for receiving, from the UE and prior to receiving the second indication, one or more PDUs of the at least one PDU set via the first UL radio bearer based on an absence of the condition. In one configuration, the network entity 1202 may include means for providing, for the UE, a third indication for the presence of the condition associated with the transmission of the first PDU set of the at least one PDU set. In one configuration, the network entity 1202 may include means for providing, for the UE, a fourth indication of criteria for the condition via at least one of RRC signaling, PDCP signaling, RLC signaling, or a MAC-CE. In one configuration, the network entity 1202 may include means for receiving, from the UE, an end marker associated with a first identifier for the first UL radio bearer via the first UL radio bearer, and for receiving, from the UE and via the second UL radio bearer, at least one of: a start marker associated with a second identifier for the second UL radio bearer, or a new data transmission. The apparatus may further include means for performing any of the aspects described in connection with the flowchart in any of FIGS. 9, 10, and/or any of the aspects performed by the network node or base station in any of FIGS. 4-8. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Traffic flows may have various characteristics in wireless communication networks, e.g., including layer attributes, timeframes for latency, etc. As an example, extended reality (XR) traffic for UL and DL may have characteristics such as application layer attributes, short timeframes for exchange where longer latency for traffic flows may reduce a user experience with an XR application or device, etc. XR traffic bursts may be periodic but may include some time jitter in their arrival, and the XR packet sizes, and the number of packets, for certain bursts may be variable. That is, XR service characteristics such as periodicity, multiple flows, jitter, latency, reliability, etc., may affect signaling throughput, latency, and other operations at base stations and other devices such as UEs on a wireless communication network. Additionally, XR traffic bursts may be associated at a UE with a QoS flow that is mapped to a given radio bearer. A PDU set may be delivered as an integrated unit to an application by a RAN. For example, a PDU set may be associated with a video frame or a slice within a video frame or the like. PDUs in the same PDU set may share common QoS attributes, and PDU sets may have different decoding criteria, which may depend on implementations for individual applications. Additionally, PDUs may be discarded by a UE and/or a RAN due to various conditions. For example, when a PDU does not have delay budget left, or one or more of its associated Layer-2 timers have expired, the PDU may be discarded. A PDU may also be discarded when the content criteria of its associated PDU set may no longer be met or already have been met.

Various aspects herein may provide UL flexibility for radio bearer mappings in association with QoS flows that enable a UE to quickly and dynamically adapt operations for improved signaling throughput and latency reduction in wireless communication networks. While the network may provide various configurations for QoS flows to the UE, the aspects herein enable the UE to adjust its implemented configurations based on dynamic radio conditions and network traffic, which improves signaling and latency. For example, aspects herein provide for a UE to receive, from a network node (e.g., a base station), a mapping configuration that indicates a configured mapping between a QoS flow and a first UL radio bearer associated with transmission of at least one PDU set. The network node may configure the UE via semi-static RRC signaling, dynamic RQoS, and/or the like. The UE may thus be enabled and configured to switch the QoS flow to map to a second UL radio bearer based on a presence of a condition associated with the transmission of a first PDU set of the at least one PDU set. Likewise, the aspects herein enable a network node (e.g., a base station) to receive, from a UE, a first indication of a UE capability associated with mapping a QoS flow with UL radio bearers for transmission of at least one PDU set. The UE may thus be enabled and configured, based on the first indication of the UE capability, with a mapping configuration that indicates a configured mapping between the QoS flow and a first UL radio bearer associated with transmission of the at least one PDU set.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving, from a network node, a mapping configuration that indicates a configured mapping between a quality of service (QoS) flow and a first uplink (UL) radio bearer where the first UL radio bearer is associated with transmission of at least one packet data unit (PDU) set; and switching the QoS flow to map to a second UL radio bearer based on a presence of a condition associated with the transmission of a first PDU set of the at least one PDU set.

Aspect 2 is the method of aspect 1, where receiving the mapping configuration comprises receiving the mapping configuration via at least one of radio resource control (RRC) signaling, packet data convergence protocol (PDCP) signaling, service data adaption protocol (SDAP) signaling, or a medium access control (MAC) control element (MAC-CE).

Aspect 3 is the method of any of aspects 1 and 2, where the mapping configuration indicates the first UL radio bearer as a default UL radio bearer that is associated with network handover operations for the UE.

Aspect 4 is the method of any of aspects 1 to 3, where the mapping configuration further indicates at least one conditional mapping between the QoS flow and at least one additional UL radio bearer, where the at least one conditional mapping is included in a QoS information element (IE), where the second UL radio bearer is one of the at least one additional UL radio bearer.

Aspect 5 is the method of any of aspects 1 to 4, further including: transmitting, to the network node and prior to switching the QoS flow to map to the second UL radio bearer, one or more PDUs of the at least one PDU set via the first UL radio bearer based on an absence of the condition.

Aspect 6 is the method of any of aspects 1 to 5, further including: obtaining an indication for the presence of the condition associated with the transmission of the first PDU set of the at least one PDU set from at least one of the network node or an operation performed at the UE.

Aspect 7 is the method of any of aspects 1 to 6, where the condition includes at least one of: an expiration of a PDU set delay budget (PSDB); a measure of a PDU set error rate (PSER) that meets a PSER threshold; a scheduling delay associated with the first UL radio bearer that meets a scheduling threshold; a cell rese-lection hysteresis characteristic; or a block error rate (BLER) associated with the first UL radio bearer that meets a BLER threshold.

Aspect 8 is the method of any of aspects 1 to 7, further including at least one of: receiving, from the network node, an indication of criteria for the condition via at least one of radio resource control (RRC) signaling, packet data convergence protocol (PDCP) signaling, radio link control (RLC) signaling, or a medium access control (MAC) control element (MAC-CE); or storing the criteria for the condition in a memory of the UE.

Aspect 9 is the method of any of aspects 1 to 8, further including: transmitting, for the network node, an end marker associated with a first identifier for the first UL radio bearer via the first UL radio bearer; and trans-mitting, for the network node and via the second UL radio bearer, at least one of: a start marker associated with a second identifier for the second UL radio bearer, or a new data transmission.

Aspect 10 is the method of any of aspects 1 to 9, further including: receiving, from the network node via a downlink (DL) reflective QoS process, an additional mapping configuration that indicates an additional con-figured mapping between the QoS flow and at least one of the first UL radio bearer or a third UL radio bearer; and switching the QoS flow, based on the additional mapping configuration, to map the QoS flow to the at least one of the first UL radio bearer or the third UL radio bearer.

Aspect 11 is a method of wireless communication at a network node, including: receiving, from a user equip-ment (UE), a first indication of a UE capability asso-ciated with mapping a quality of service (QoS) flow with uplink (UL) radio bearers for transmission of at least one packet data unit (PDU) set; and configuring the UE, based on the first indication of the UE capa-bility, with a mapping configuration that indicates a configured mapping between the QoS flow and a first UL radio bearer, where the first UL radio bearer is associated with transmission of at least one PDU set.

Aspect 12 is the method of aspect 11, where configuring the UE includes providing the mapping configuration to the UE via at least one of radio resource control (RRC) signaling, packet data convergence protocol (PDCP) signaling, service data adaption protocol (SDAP) signaling, or a medium access control (MAC) control element (MAC-CE).

Aspect 13 is the method of any of aspects 11 and 12, where the mapping configuration indicates the first UL radio bearer as a default UL radio bearer that is associated with network handover operations for the UE.

Aspect 14 is the method of any of aspects 11 to 13, where the mapping configuration further indicates at least one conditional mapping between the QoS flow and at least one additional UL radio bearer, where the at least one conditional mapping is included in a QoS information element (IE); the method further including: receiving, from the UE, a second indication that the UE has switched the QoS flow to map to a second UL radio bearer based on a presence of a condition associated with the transmission of a first PDU set of the at least one PDU set, where the second UL radio bearer is one of the UL radio bearers.

Aspect 15 is the method of aspect 14, further including: receiving, from the UE and prior to receiving the second indication, one or more PDUs of the at least one PDU set via the first UL radio bearer based on an absence of the condition.

Aspect 16 is the method of aspect 14, further including: providing, for the UE, a third indication for the pres-ence of the condition associated with the transmission of the first PDU set of the at least one PDU set.

Aspect 17 is the method of aspect 14, where the condition includes at least one of: an expiration of a PDU set delay budget (PSDB); a measure of a PDU set error rate (PSER) that meets a PSER threshold; a scheduling delay associated with the first UL radio bearer that meets a scheduling threshold; a cell reselection hyster-esis characteristic; or a block error rate (BLER) asso-ciated with the first UL radio bearer that meets a BLER threshold.

Aspect 18 is the method of aspect 14, further including: providing, for the UE, a fourth indication of criteria for the condition via at least one of radio resource control (RRC) signaling, packet data convergence protocol (PDCP) signaling, radio link control (RLC) signaling, or a medium access control (MAC) control element (MAC-CE).

Aspect 19 is the method of aspect 14, further including: receiving, from the UE, an end marker associated with a first identifier for the first UL radio bearer via the first UL radio bearer; and receiving, from the UE and via the second UL radio bearer, at least one of: a start marker associated with a second identifier for the second UL radio bearer, or a new data transmission.

Aspect 20 is the method of aspect 14, further including: providing, for the UE via a downlink (DL) reflective QoS process, an additional mapping configuration that indicates an additional configured mapping between the QoS flow and at least one of the first UL radio bearer or a third UL radio bearer, where the additional mapping configuration is configured to cause the UE to switch the QoS flow to map to the at least one of the first UL radio bearer or the third UL radio bearer.

Aspect 21 is an apparatus for wireless communication including means for implementing any of aspects 1 to 10.

Aspect 22 is a computer-readable medium (e.g., a non-transitory computer-readable medium) storing com-puter executable code, the code when executed by at least one processor causes the at least one processor to implement any of aspects 1 to 10.

Aspect 23 is an apparatus for wireless communication at a network node. The apparatus includes a memory; and at least one processor coupled to the memory and, based at least in part on information stored in the memory, the at least one processor is configured to implement any of aspects 1 to 10.

Aspect 24 is the apparatus of aspect 23, further including at least one of a transceiver or an antenna coupled to the at least one processor.

Aspect 25 is an apparatus for wireless communication including means for implementing any of aspects 11 to 20.

Aspect 26 is a computer-readable medium (e.g., a non-transitory computer-readable medium) storing computer executable code, the code when executed by at least one processor causes the at least one processor to implement any of aspects 11 to 20.

Aspect 27 is an apparatus for wireless communication at a network node. The apparatus includes a memory; and at least one processor coupled to the memory and, based at least in part on information stored in the memory, the at least one processor is configured to implement any of aspects 11 to 20.

Aspect 28 is the apparatus of aspect 27, further including at least one of a transceiver or an antenna coupled to the at least one processor.

What is claimed is:

1. An apparatus for wireless communication at a user equipment (UE), comprising:
  memory; and
  at least one processor coupled to the memory and, based at least in part on information stored in the memory, the at least one processor is configured to:
    receive, from a network node, a mapping configuration that indicates a configured mapping between a quality of service (QoS) flow and a first uplink (UL) radio bearer, wherein the first UL radio bearer is associated with transmission of at least one packet data unit (PDU) set, wherein a PDU set includes two or more PDUs as an integrated set of the two or more PDUs with at least one common QoS attribute; and
    switch the QoS flow to map to a second UL radio bearer based on a presence of a condition associated with the transmission of a first PDU set of the at least one PDU set.

2. The apparatus of claim 1, wherein receiving the mapping configuration comprises receiving the mapping configuration via at least one of radio resource control (RRC) signaling, packet data convergence protocol (PDCP) signaling, service data adaption protocol (SDAP) signaling, or a medium access control (MAC) control element (MAC-CE).

3. The apparatus of claim 1, wherein the mapping configuration indicates the first UL radio bearer as a default UL radio bearer that is associated with network handover operations for the UE.

4. The apparatus of claim 1, wherein the mapping configuration further indicates at least one conditional mapping between the QoS flow and at least one additional UL radio bearer, wherein the at least one conditional mapping is included in a QoS information element (IE), wherein the second UL radio bearer is one of the at least one additional UL radio bearer.

5. The apparatus of claim 1, wherein the at least one processor is further configured to:
  transmit, to the network node and prior to switching the QoS flow to map to the second UL radio bearer, one or more PDUs of the at least one PDU set via the first UL radio bearer based on an absence of the condition.

6. The apparatus of claim 1, wherein the at least one processor is further configured to:
  obtain an indication for the presence of the condition associated with the transmission of the first PDU set of the at least one PDU set from at least one of the network node or an operation performed at the UE.

7. The apparatus of claim 1, wherein the condition includes at least one of:
  an expiration of a PDU set delay budget (PSDB);
  a measure of a PDU set error rate (PSER) that meets a PSER threshold;
  a scheduling delay associated with the first UL radio bearer that meets a scheduling threshold;
  a cell reselection hysteresis characteristic; or
  a block error rate (BLER) associated with the first UL radio bearer that meets a BLER threshold.

8. The apparatus of claim 1, wherein the at least one processor is further configured to:
  receive, from the network node, an indication of criteria for the condition via at least one of radio resource control (RRC) signaling, packet data convergence protocol (PDCP) signaling, radio link control (RLC) signaling, or a medium access control (MAC) control element (MAC-CE); or
  store the criteria for the condition in the memory of the UE.

9. The apparatus of claim 1, wherein the at least one processor is further configured to:
  transmit, for the network node, an end marker associated with a first identifier for the first UL radio bearer via the first UL radio bearer; and
  transmit, for the network node and via the second UL radio bearer, at least one of:
    a start marker associated with a second identifier for the second UL radio bearer, or
    a new data transmission.

10. The apparatus of claim 1, wherein the at least one processor is further configured to:
  receive, from the network node via a downlink (DL) reflective QoS process, an additional mapping configuration that indicates an additional configured mapping between the QoS flow and at least one of the first UL radio bearer or a third UL radio bearer; and
  switch the QoS flow, based on the additional mapping configuration, to map the QoS flow to the at least one of the first UL radio bearer or the third UL radio bearer.

11. An apparatus for wireless communication at a network node, comprising:
  memory; and
  at least one processor coupled to the memory and, based at least in part on information stored in the memory, the at least one processor is configured to:
    receive, from a user equipment (UE), a first indication of a UE capability associated with mapping a quality of service (QoS) flow with uplink (UL) radio bearers for transmission of at least one packet data unit (PDU) set, wherein a PDU set includes two or more PDUs as an integrated set of the two or more PDUs with at least one common QoS attribute; and
    configure the UE, based on the first indication of the UE capability, with a mapping configuration that indicates a configured mapping between the QoS flow and a first UL radio bearer, wherein the first UL radio bearer is associated with transmission of the at least one PDU set.

12. The apparatus of claim 11, wherein configuring the UE comprises providing the mapping configuration to the UE via at least one of radio resource control (RRC) signaling, packet data convergence protocol (PDCP) signaling, service data adaption protocol (SDAP) signaling, or a medium access control (MAC) control element (MAC-CE).

13. The apparatus of claim 11, wherein the mapping configuration indicates the first UL radio bearer as a default UL radio bearer that is associated with network handover operations for the UE.

14. The apparatus of claim 11, wherein the mapping configuration further indicates at least one conditional mapping between the QoS flow and at least one additional UL radio bearer, wherein the at least one conditional mapping is included in a QoS information element (IE);

wherein the at least one processor is further configured to:
receive, from the UE, a second indication that the UE has switched the QoS flow to map to a second UL radio bearer based on a presence of a condition associated with the transmission of a first PDU set of the at least one PDU set, wherein the second UL radio bearer is one of the UL radio bearers.

15. The apparatus of claim 14, wherein the at least one processor is further configured to:
receive, from the UE and prior to receiving the second indication, one or more PDUs of the at least one PDU set via the first UL radio bearer based on an absence of the condition.

16. The apparatus of claim 14, wherein the at least one processor is further configured to:
provide, for the UE, a third indication for the presence of the condition associated with the transmission of the first PDU set of the at least one PDU set.

17. The apparatus of claim 14, wherein the condition includes at least one of:
an expiration of a PDU set delay budget (PSDB);
a measure of a PDU set error rate (PSER) that meets a PSER threshold;
a scheduling delay associated with the first UL radio bearer that meets a scheduling threshold;
a cell reselection hysteresis characteristic; or
a block error rate (BLER) associated with the first UL radio bearer that meets a BLER threshold.

18. The apparatus of claim 14, wherein the at least one processor is further configured to:
provide, for the UE, a fourth indication of criteria for the condition via at least one of radio resource control (RRC) signaling, packet data convergence protocol (PDCP) signaling, radio link control (RLC) signaling, or a medium access control (MAC) control element (MAC-CE).

19. The apparatus of claim 14, wherein the at least one processor is further configured to:
receive, from the UE, an end marker associated with a first identifier for the first UL radio bearer via the first UL radio bearer; and
receive, from the UE and via the second UL radio bearer, at least one of:
a start marker associated with a second identifier for the second UL radio bearer, or
a new data transmission.

20. The apparatus of claim 14, wherein the at least one processor is further configured to:
provide, for the UE via a downlink (DL) reflective QoS process, an additional mapping configuration that indicates an additional configured mapping between the QoS flow and at least one of the first UL radio bearer or a third UL radio bearer, wherein the additional mapping configuration is configured to cause the UE to switch the QoS flow to map to the at least one of the first UL radio bearer or the third UL radio bearer.

21. A method of wireless communication at a user equipment (UE), comprising:
receiving, from a network node, a mapping configuration that indicates a configured mapping between a quality of service (QoS) flow and a first uplink (UL) radio bearer, wherein the first UL radio bearer is associated with transmission of at least one packet data unit (PDU) set, wherein a PDU set includes two or more PDUs as an integrated set of the two or more PDUs with at least one common QoS attribute; and
switching the QoS flow to map to a second UL radio bearer based on a presence of a condition associated with the transmission of a first PDU set of the at least one PDU set.

22. The method of claim 21, wherein receiving the mapping configuration comprises receiving the mapping configuration via at least one of radio resource control (RRC) signaling, packet data convergence protocol (PDCP) signaling, service data adaption protocol (SDAP) signaling, or a medium access control (MAC) control element (MAC-CE).

23. The method of claim 21, wherein the mapping configuration indicates the first UL radio bearer as a default UL radio bearer that is associated with network handover operations for the UE.

24. The method of claim 21, wherein the mapping configuration further indicates at least one conditional mapping between the QoS flow and at least one additional UL radio bearer, wherein the at least one conditional mapping is included in a QoS information element (IE), wherein the second UL radio bearer is one of the at least one additional UL radio bearer.

25. The method of claim 21, further comprising:
transmitting, to the network node and prior to switching the QoS flow to map to the second UL radio bearer, one or more PDUs of the at least one PDU set via the first UL radio bearer based on an absence of the condition.

26. A method of wireless communication at a network node, comprising:
receiving, from a user equipment (UE), a first indication of a UE capability associated with mapping a quality of service (QoS) flow with uplink (UL) radio bearers for transmission of at least one packet data unit (PDU) set, wherein a PDU set includes two or more PDUs as an integrated set of the two or more PDUs with at least one common QoS attribute; and
configuring the UE, based on the first indication of the UE capability, with a mapping configuration that indicates a configured mapping between the QoS flow and a first UL radio bearer, wherein the first UL radio bearer is associated with transmission of the at least one PDU set.

27. The method of claim 26, wherein configuring the UE comprises providing the mapping configuration to the UE via at least one of radio resource control (RRC) signaling, packet data convergence protocol (PDCP) signaling, service data adaption protocol (SDAP) signaling, or a medium access control (MAC) control element (MAC-CE).

28. The method of claim 26, wherein the mapping configuration indicates the first UL radio bearer as a default UL radio bearer that is associated with network handover operations for the UE.

29. The method of claim 26, wherein the mapping configuration further indicates at least one conditional mapping between the QoS flow and at least one additional UL radio bearer, wherein the at least one conditional mapping is included in a QoS information element (IE);

the method further comprising:

receiving, from the UE, a second indication that the UE has switched the QoS flow to map to a second UL radio bearer based on a presence of a condition associated with the transmission of a first PDU set of the at least one PDU set, wherein the second UL radio bearer is one of the UL radio bearers.

30. The method of claim 29, further comprising:

receiving, from the UE and prior to receiving the second indication, one or more PDUs of the at least one PDU set via the first UL radio bearer based on an absence of the condition.

* * * * *